US009709867B2

(12) United States Patent
Ersman et al.

(10) Patent No.: US 9,709,867 B2
(45) Date of Patent: Jul. 18, 2017

(54) DISPLAY DEVICE

(75) Inventors: Peter Andersson Ersman, Finspång (SE); Jun Kawahara, Norrköping (SE)

(73) Assignees: RISE Acreo AB, Kista (SE); Lintec Corporation, Tokyo (JP)

(*) Notice: Subject to any disclaimer, the term of this patent is extended or adjusted under 35 U.S.C. 154(b) by 0 days.

(21) Appl. No.: 13/253,179

(22) Filed: Oct. 5, 2011

(65) Prior Publication Data

US 2012/0081775 A1    Apr. 5, 2012

Related U.S. Application Data

(63) Continuation-in-part of application No. PCT/EP2011/055284, filed on Apr. 5, 2011.

(60) Provisional application No. 61/389,769, filed on Oct. 5, 2010.

(30) Foreign Application Priority Data

Oct. 5, 2010  (EP) ..................... 10186570

(51) Int. Cl.
  *G02F 1/155*    (2006.01)
  *G02F 1/15*    (2006.01)

(52) U.S. Cl.
  CPC ...... *G02F 1/155* (2013.01); *G02F 2001/1515* (2013.01); *G02F 2001/1519* (2013.01); *G02F 2001/1552* (2013.01)

(58) Field of Classification Search
  CPC ...... G02F 1/155; G02F 1/1523; G02F 1/1525; G02F 1/163; G02F 2001/1519; G02F 2001/1552; G02F 2001/1515; G09F 9/30; G09G 3/2927; G09G 3/3607; G06F 3/0412; C09K 9/02

USPC .... 359/265, 269, 270, 271, 273; 345/44, 60, 345/88, 104, 105

See application file for complete search history.

(56) References Cited

U.S. PATENT DOCUMENTS

| 4,488,781 A | 12/1984 | Giglia |
| 5,206,756 A | 4/1993 | Cheshire |
| 6,162,563 A | 12/2000 | Miura et al. |
| 6,193,912 B1 | 2/2001 | Thieste et al. |
| 6,524,736 B1 | 2/2003 | Sompalli et al. |
| 6,639,709 B2 * | 10/2003 | Vincent et al. ............... 359/265 |

(Continued)

FOREIGN PATENT DOCUMENTS

| CN | 1199408 A | 11/1998 |
| CN | 1496491 A | 5/2004 |

(Continued)

OTHER PUBLICATIONS

Andersson et al, "Printable All-Organic Electrochromic Active-Matrix Displays". Advanced Functional Materials, 2007, 17, p. 3074-3082.*

(Continued)

*Primary Examiner* — Jie Lei

(74) *Attorney, Agent, or Firm* — Harness, Dickey & Pierce, P.L.C.

(57) ABSTRACT

There is disclosed an electrochromic passive-matrix display, wherein each passively addressed pixel cell comprises an electrolyte ionically connecting an electrochromic and electrochemically active polymer and a layer of electrically conducting carbon. Thus, each pixel has a pronounced threshold voltage sufficient for reducing cross talk in an electrochromic display.

22 Claims, 10 Drawing Sheets

(56) References Cited

U.S. PATENT DOCUMENTS

| | | | |
|---|---|---|---|
| 6,642,069 | B2 | 11/2003 | Armgarth et al. |
| 6,747,779 | B1 | 6/2004 | Morin et al. |
| 6,879,424 | B2 | 4/2005 | Vincent et al. |
| 7,012,306 | B2 | 3/2006 | Armgarth et al. |
| 7,177,064 | B2 * | 2/2007 | Park .................. 359/270 |
| 7,186,665 | B2 | 3/2007 | De Heer et al. |
| 7,390,528 | B2 | 6/2008 | Morii |
| 7,396,607 | B2 | 7/2008 | Masaka et al. |
| 7,754,369 | B2 | 7/2010 | Starz et al. |
| 2004/0211989 | A1 | 10/2004 | Armgarth et al. |
| 2004/0218346 | A1 | 11/2004 | Takeuchi et al. |
| 2005/0068603 | A1 | 3/2005 | Berggren et al. |
| 2005/0275923 | A1 | 12/2005 | Park |
| 2006/0018001 | A1 | 1/2006 | Kojima et al. |
| 2006/0116001 | A1 | 6/2006 | Wang |
| 2006/0285190 | A1 | 12/2006 | Agrawal et al. |
| 2007/0138463 | A1 | 6/2007 | Herlogsson et al. |
| 2007/0187242 | A1 | 8/2007 | Nair et al. |
| 2008/0074724 | A1 | 3/2008 | Agrawal et al. |
| 2008/0304132 | A1 | 12/2008 | Jung et al. |
| 2009/0090907 | A1 | 4/2009 | Kugler et al. |
| 2010/0173195 | A1 | 7/2010 | Mizuta et al. |
| 2011/0096388 | A1 | 4/2011 | Agrawal et al. |
| 2012/0081775 | A1 | 4/2012 | Ersman et al. |
| 2013/0128332 | A1 | 5/2013 | Andersson Ersman et al. |
| 2014/0041213 | A1 | 2/2014 | Andersson Ersman et al. |

FOREIGN PATENT DOCUMENTS

| | | | |
|---|---|---|---|
| CN | 1498357 | A | 5/2004 |
| CN | 1639297 | A | 7/2005 |
| CN | 1965263 | A | 5/2007 |
| CN | 101909823 | A | 12/2010 |
| EP | 0492387 | * | 7/1992 ............... G02F 1/15 |
| EP | 0492387 | A2 | 7/1992 |
| JP | 60217345 | A | 10/1985 |
| JP | 61-130929 | A | 6/1986 |
| JP | 2006-030820 | A | 2/2006 |
| JP | 2007-214326 | A | 8/2007 |
| JP | 2010-177678 | A | 8/2010 |
| WO | WO-02/071139 | A1 | 9/2002 |
| WO | WO-02/071505 | A1 | 9/2002 |
| WO | WO-02075442 | A1 | 9/2002 |
| WO | WO-2004114008 | A1 | 12/2004 |
| WO | WO-2005/027599 | A1 | 3/2005 |
| WO | WO-2005121882 | A1 | 12/2005 |
| WO | WO-2006/085258 | A2 | 8/2006 |
| WO | WO-2006/097566 | A1 | 9/2006 |
| WO | WO-2007/043419 | A1 | 4/2007 |
| WO | WO-2008/066458 | A1 | 6/2008 |
| WO | WO-2008/126574 | A1 | 10/2008 |
| WO | WO-2008128726 | A1 | 10/2008 |
| WO | WO-2010003138 | A1 | 1/2010 |

OTHER PUBLICATIONS

Yu et al "Fabrication of carbon nanotube based transparent conductive thin films using layer-by-layer technology", Surface & Coatings Technology 202 (2008) 2002-2007.*

Andersson, P. et al. "Printable All-Organic Electrochromic Active-Matrix Displays", Advanced Functional Materials, Wiley-V C H Verlag GmBH & Co. KGAA, DE, vol. 17, No. 16, Nov. 5, 2007, pp. 3074-3082.

Aliev, A. E. et al., "Image diffusion and cross-talk in passive matrix electrochromic displays", Displays 23 (2002) 239-247.

International Search Report.

European Search Report.

Office Communication dated Jan. 9, 2012 issued in corresponding European Application No. 21047271.

Chinese Office Action dated Feb. 24, 2014 for corresponding Chinese Application No. 201080044527.4 (full translation provided).

Matthew J. Panzer and C. Daniel Frisbie, "Polymer Electrolyte-Gated Organic Field-Effect Transistors: Low-Voltage, High-Current Switches for Organic Electronics and Testbeds for Probing Electrical Transport at High Charge Carrier Density", J. Am. Chem. Soc., vol. 129, No. 20, 2007; pp. 6599-6607.

International Search Report and Written Opinion dated May 10, 2011 issued in PCT Application No. PCT/EP2011/055284.

European Search Report dated Jan. 27, 2011 issued in European Application No. 21047271.

Bartlett, P., et al. (2000) "Microelectrochemical enzyme transistors" *Chem. Commun.*, pp. 105-112.

Chen, M. (2005) "Printed electrochemical devices using conducting polymers as active materials on flexible substrates" *Proceedings of the IEEE*, 93(7):1339-1347.

Mabeck, J., et al. (2005) "Microfluidic gating of an organic electrochemical transistor" *Applied Physics Letters*, 87:013503-1-013503-3.

Nilsson, D., et al. (2005) "The electrochemical transistor and circuit design considerations" *ITN*, 3:III/349-III/352.

Nilsson, D., et al. (2002) "Bi-stable and dynamic current modulation in electrochemical organic transistors" *Advanced Materials*, 14(1):51-54.

Panzer, M., et al. (2006) "High carrier density and metallic conductivity in poly(3-hexylthiophene) achieved by electrostatic charge injection" *Advanced Functional Materials*, 16(8):1051-1056.

European Search Report dated Mar. 26, 2010 issued in European Application No. 09 17 2227.

International Search Report and Written Opinion dated Jan. 4, 2011 issued in PCT Application No. PCT/EP2010/064818.

International Preliminary Report on Patentability dated Feb. 17, 2012 issued in PCT Application No. PCT/EP2010/064818.

Epstein, A. (1991), "Novel concepts in electronic polymers: polyaniline and its derivatives", *Makromol. Chem., Macromol. Symp.*, 51: 217-234.

Fichou, D. (1999), "Application of electrically conductive polythiophenes", *Handbook of Oligo-and Polythiophenes*, 10: 491-524.

Gustaffson, J.C., et al. (1994), "In situ spectroscopic investigations of electrochromism and ion transport in a poly (3,4-ethylenedioxythiophene) electrode in a solid state electrochemical cell", *Solid State Ionics*, 69: 145-152.

Onoda, M., et al. (1994), Properties of electrochemically cation-doped poly(isothianaphthene), *J. Electrochem. Soc.*, 141(2): 338-341.

Schottland, P., et al. (2000), "Poly(3-4-alkylenedioxypyrrole)s: highly stable electronically conducting and electrochromic polymers", *Macromolecules*, 33: 7051-7061.

Thom, E., et al. (2005) "Replicative generation of metal microstructures by template-directed electrometallization", Applied Physics Letters, 87:24101-1-024101-3.

International Preliminary Report on Patentability dated May 21, 2013 issued in PCT Application No. PCT/EP2012/056237.

International Search Report dated Jun. 12, 2012 issued in PCT Application No. PCT/EP2012/056237.

Written Opinion dated Feb. 28, 2013 issued in PCT Application No. PCT/EP2012/056237.

Notice of Reasons for Refusal dated Sep. 24, 2014 for corresponding Japanese Application No. 2013-532084 (full translation provided).

Brief Communication dated Jun. 22, 2015 issued in European Patent Application No. 11711945.3.

Chinese Office Action dated Mar. 27, 2015 issued in Chinese Application No. 201180047280.6 (English translation only).

Chinese Office Action dated May 27, 2015 issued in Chinese Application No. 201280025785.7 (English translation only).

Office Action dated Dec. 23, 2015 issued in U.S. Appl. No. 14/006,999.

Andersson Ersman, Peter et al. "Fast-switching all-printed organic electrochemical transistors." Organic Electronics 14 (2013): 1276-1280.

(56) References Cited

OTHER PUBLICATIONS

European Office Action dated Mar. 23, 2017 issued in corresponding European Application No. 10760706.1.

* cited by examiner

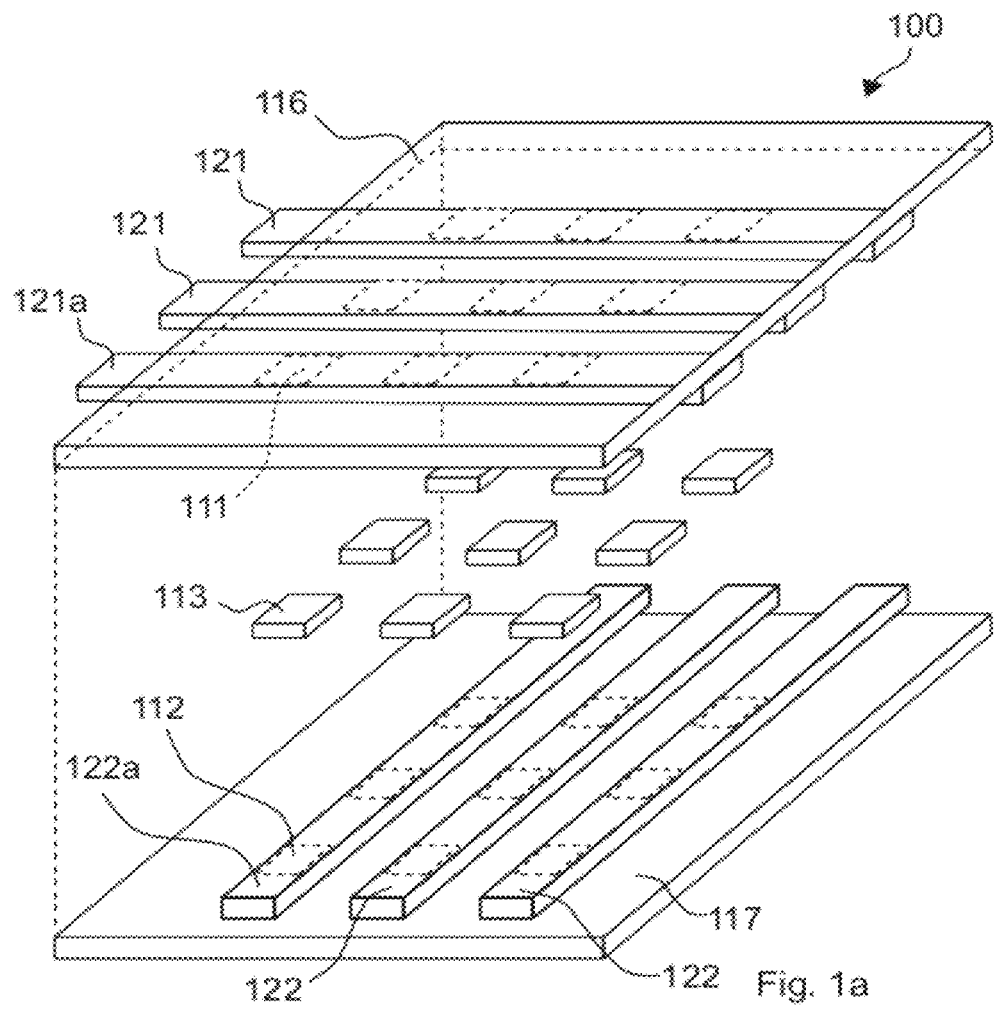
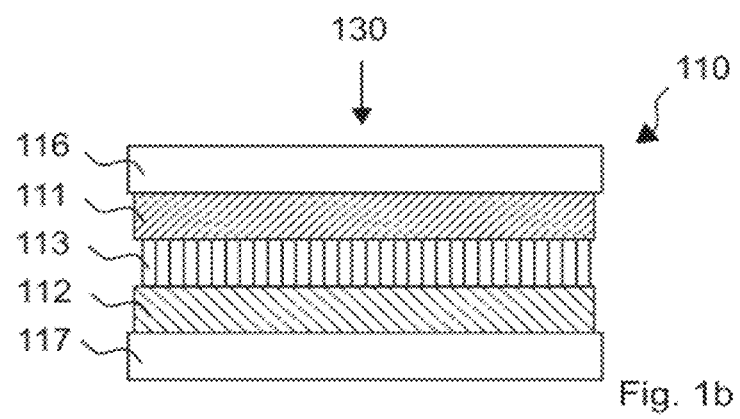
Fig. 1a
Fig. 1b

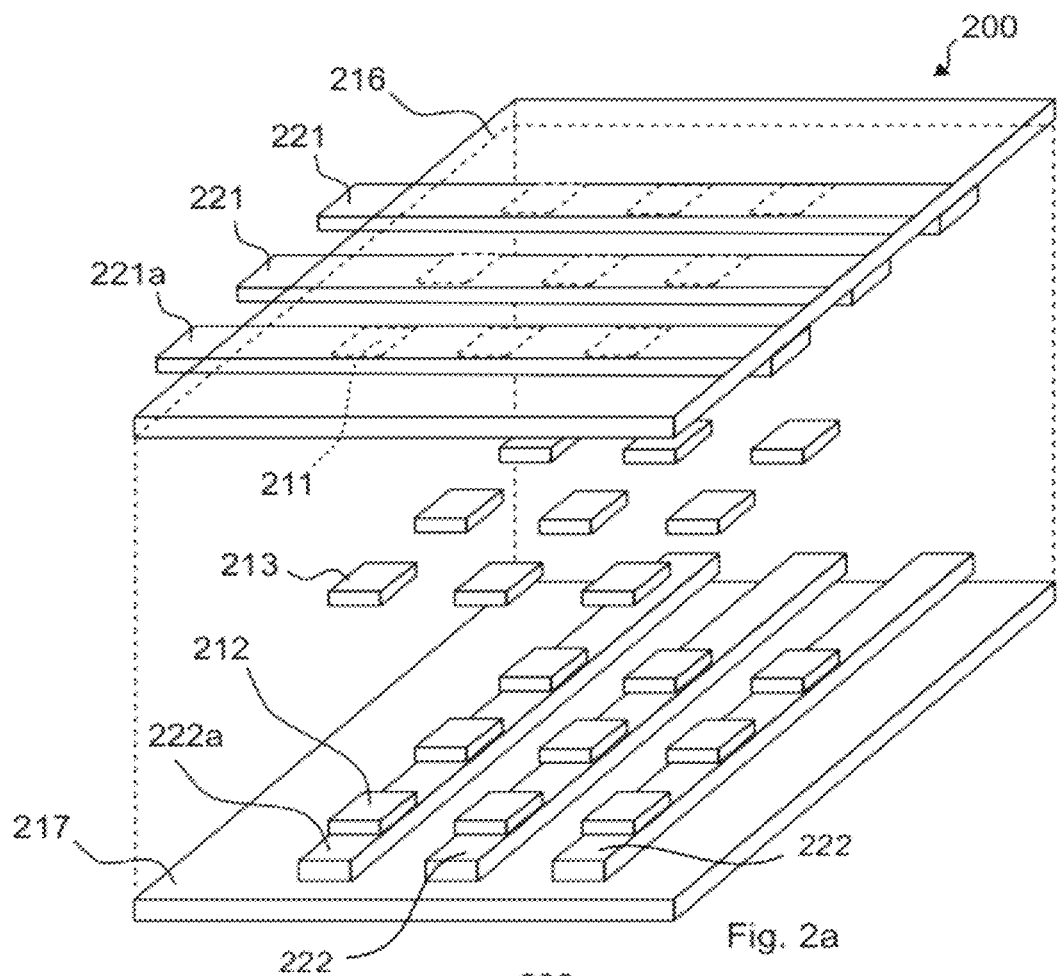
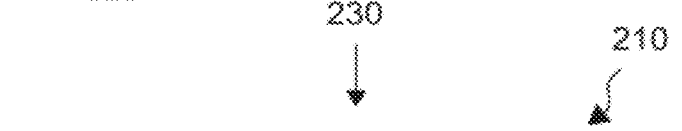
Fig. 2a
Fig. 2b

DISPLAY DEVICE

CROSS-REFERENCE TO RELATED APPLICATIONS

This application is a continuation-in-part of PCT/EP2011/055284 filed on Apr. 5, 2011, which is an international application claiming priority from EP 10186570.7 filed on Oct. 5, 2010 and U.S. provisional application U.S. 61/389,769 filed on Oct. 5, 2010 the entire contents of which are hereby incorporated by reference.

FIELD OF THE INVENTION

The present invention relates to electrochemically active organic pixel devices and in particular to printable, electrochemically active pixel devices based on organic electrochromic materials

BACKGROUND ART

In directly addressed electrochromic displays each pixel is connected by a separate electric conduction line to an external drive voltage source, facilitating simultaneous individual electrical control of all pixels in the display. When the number of pixels in a display is large, it is either physically impossible or impractical to connect one separate line to each pixel. To overcome this problem the pixels are commonly arranged in a matrix structure in which they are addressed by time-multiplexing techniques via row and column lines from the matrix edges. Such displays and the methods of addressing them are denoted matrix displays and matrix addressing, respectively.

In active-matrix displays each pixel is equipped with a respective electronic circuit with at least one transistor, in which the conduction state of each transistor controls the colour state of the respective pixel.

Matrix displays without a separate transistor for each pixel are called passive-matrix displays. The pixel circuitry in active-matrix displays improves the addressing properties of the pixels, however, the manufacturing of active-matrix displays is more complicated and expensive, compared to passive-matrix displays. On the other hand, several drawbacks such as slow response time, image diffusion and cross-talk have limited practical applications of passive-matrix addressed electrochromic devices. The image diffusion can be classified as a cross-talk effect in a broad sense. It is a phenomenon which is an interaction between pixels through the electrolyte, and causes a slight coloration of neighboring pixels on the chosen row and column. The undesirable coloration decreases with increasing distance from the selected pixel. A commonly used technique for minimizing the image diffusion effect is a physical isolation of the individual display pixels from each other.

Another source of cross-talk is an interaction between pixels via the electrodes associated with the matrix. I.e. not only the pixel at the intersection of the addressed pair of a column and a row changes its color, but also other neighboring pixels. Cross-talk occurs because a voltage difference is present also across the electrolyte in pixels surrounding to the addressed pixel. Moreover, an electrically isolated colored display pixel normally has a different voltage across its electrodes compared to a clear non-charged pixel. When two pixels are charged into different colour states and connected together, the colored pixel tends to drive or colour the clear pixel through capacitive discharging.

One example of an electrochromic passive matrix display is described in WO 2004/114008. The pixel comprises an electrolyte sandwiched between two organic layers, each comprising electrochromic polymers. Further, the pixel is sandwiched between two electrodes. Moreover, the passive matrix display is formed by adding a layer with diode character between one of the electrodes and the organic layer. In other words, a threshold voltage has to be exceeded before the pixel may alter its color. Hence, the amount of cross-talk in the display is reduced. Besides introducing a layer with diode function in the pixel, the application also suggests that a passively addressable pixel may be achieved by a careful combination of pixel materials, but absolutely no information or examples are given as to how these materials should be selected in order to achieve this effect.

SUMMARY OF THE INVENTION

An object of the present invention is to present a material combination, which provide a passively addressable pixel without the need for a separate diode layer in the pixel.

These and other objects are met by the subject matters provided in the independent claims. Preferred embodiments of the invention are presented in the independent claims.

According to a first aspect thereof, the present invention relates to a passive matrix display device, comprising
 a set of pixel cells arranged in a matrix,
 wherein each pixel cell comprises:
 a first pixel layer comprising electrochromic and electrochemically active organic polymer material being electrochemically switchable between different visually detectable coloring states,
 a second pixel layer, facing said first pixel layer, and
 a third pixel layer of solidified electrolyte which is arranged spatially between, and in ionic contact with, said first and second pixel layers, and wherein said second pixel layer of each pixel cell is formed of or comprises electrically conductive carbon.

According to a second aspect thereof, the present invention relates to a passive matrix display device, comprising
 a set of pixel cells arranged in a matrix,
 wherein each pixel cell comprises:
 a first pixel layer comprising electrochromic and electrochemically active organic polymer material being electrochemically switchable between different visually detectable coloring states,
 a second pixel layer, facing said first pixel layer, and
 a third pixel layer of solidified electrolyte which is arranged spatially between, and in ionic contact with, said first and second pixel layers, and wherein said second pixel layer of each pixel cell is formed of electrically conductive carbon thereby providing a threshold voltage at least in response to a voltage applied across said electrolyte.

In the following the third pixel layer may be referred to as the electrolyte.

In all embodiments of the invention, the coloring of each pixel is provided by a change in redox state of said electrochromic and electrochemically active organic polymer material, which causes a change of color of the electrochromic material. In other words, the electrolyte is normally free of colorants such as pH dyes, i.e. dyes which changes color in response to the surrounding pH. In yet other words, the color of the electrolyte normally remains unchanged or substantially unchanged during a color switching of the pixel. In yet other words, the color of the electrolyte is non-switchable, i.e. the color of the electrolyte remains the same or remains substantially the same when a voltage is applied across the display sufficiently long for at least causing a color switch, or color change, of said first pixel layer. In addition to what has been stated with respect to the electrolyte being free of colorants, which changes color when a potential difference is applied between said first and second pixel layers, the electrolyte may comprise colorants or opacifiers for reducing the transparency of the electrolyte. The opacifiers normally do not change color when a voltage difference is applied between the first and second pixel layer. I.e. the color of the opacifiers normally remains the same or substantially the same.

Furthermore, said first pixel layer and said second pixel layer are ionically connected and electronically isolated, or substantially electronically isolated, from each other by at least one layer being arranged between said first and second pixel layer, wherein the at least one layer comprises the third pixel layer. According to one embodiment the third pixel layer is ionically conductive and electronically isolative, or substantially electronically isolative, i.e. the third pixel layer does not transport electrons to any substantial extent. If the third pixel layer was not substantially electronically isolative, this material would cause an electronic short circuit of the device, which would normally prevent or at least impair a color change of the electrochromic material.

The second pixel layer is normally arranged to function as the counter electrode in the electrochemical process, wherein the first pixel layer forms the active colour changing layer of the pixel device. The layers of the pixel device are arranged substantially in parallel with each other. According to one embodiment, the layers in front of said first pixel layer, e.g. said first insulating layer and said first electrodes, are preferably transparent or semi-transparent, such that the colour change of the pixel device can be visually detected.

In other words, the second pixel layer is electronically conducting. Further, the second pixel layer comprises carbon, or is formed of or comprise an electronically conductive material comprising carbon.

According to one example there is provided a method of controlling a passive matrix display device, comprising a set of pixel cells arranged in a matrix,
  wherein each pixel cell comprises: a first pixel layer comprising electrochromic and electrochemically active organic polymer material being electrochemically switchable between different visually detectable coloring states,
  a second pixel layer, facing said first pixel layer, and
  a third pixel layer of solidified electrolyte which is arranged spatially between, and in ionic contact with, said first and second pixel layers, and wherein said second pixel layer of each pixel cell is formed of or comprises electrically conductive carbon,
  wherein the method comprises applying and maintaining a potential difference between said first pixel layer and said second pixel layer, which potential difference causes said first pixel layer to change color.

In more detail, the passive matrix display device may be arranged such that while the potential difference, which causes said first pixel layer to change color, is applied; the color of said third pixel layer remains unchanged or substantially unchanged.

By arranging a device as described in relation to said first, second or third aspect, a pixel having a pronounced threshold voltage sufficient for reducing cross talk in an electrochromic display is provided. Although the chemical and physical mechanisms governing the threshold properties of the electrochromic pixel device are still to be revealed, the resulting voltage threshold behavior may be taken advantage of in order to minimize cross-talk effects within a matrix display, such as current and colour contrast changes which are non-linear with the applied voltage.

According to one embodiment the display device further comprises a set of first electrodes and a set of second electrodes, which are electronically isolated from each other and arranged in a pattern such that:
  each of said first electrodes intersects each of said second electrodes at only one intersection,
  each of said second electrodes intersects each of said first electrodes at only one intersection, and
  each of said pixel cells is arranged at a respective one of said intersections formed by a respective first and second electrodes, wherein:
  said first pixel layer of each of said pixel cells coincides with a portion of, or is in electronic contact with, said respective first electrode, and
  said second pixel layer of each of said pixel cells coincides with a portion of, or is in electronic contact with, said respective second electrode.

An advantage related to that the pixel layer coincides with the electrode layer is that fewer printing steps are needed, i.e. a more efficient manufacturing process may be achieved.

An advantage related to that the pixel layer is different from the electrode is that different materials may be used for the pixel layer and the electrode. By selecting an electrode material having higher electrode conductivity compared to the pixel layer, a less pronounced voltage drop along the electrode may be provided and thereby a better switching of each pixel cell.

According to one embodiment of the display device, it does not comprise a set of separate control elements, each control element being associated with a respective one of said pixel cells and arranged to provide a transistor function for actively controlling the color of said pixel cell. In relation to this invention a separate control element is a control element which is not part of the pixel cell. I.e. the control element is arranged electrically upstream or downstream of the pixel cell.

According to one embodiment of the display device, it is arranged on a flexible substrate or flexible carrier, and preferably a substrate or carrier comprising paper and/or plastic. An advantage related to the use of flexible substrates is that it facilitates the use of a printing process for manufacturing the display, According to one embodiment of the display device, it is formed of or comprises layers which are at least one of printable and flexible.

According to one embodiment of the display device, said first electrodes and the first pixel layer of said pixel cells are all arranged or formed of the same material, and/or said second electrodes and the second pixel layer of said pixel cells are all arranged or formed of the same material. An advantage related to the use of the same material for several components is that it simplifies and speeds up the manufacturing process.

According to one embodiment of the display device, said first electrodes and the first pixel layer of each of said pixel cells are all portions of the same layer, and/or said second electrodes and the second pixel layer of each of said pixel cells are all portions of the same layer. An advantage related to this embodiment is that it normally provides a simplified architecture, thus gives rise to fewer printing steps, and more cost effective production.

Alternatively, different materials are used for the second pixel layer and the second electrodes, respectively, although said second pixel layer and the second electrodes are all arranged in the same plane. The electrodes may be arranged of or comprises a material having a higher conductivity, thereby reducing the switching time for said first pixel layer, enable the use of a lower operating voltage and/or giving a higher colour contrast. That the electrodes have a higher conductivity than said first pixel layer lowers the voltage drop along the electrodes.

According to one embodiment of the display device, said display device comprises an insulating layer, preferably a plastic insulating layer, arranged between said second electrode and said second pixel layer in each pixel cell of said set of pixel cells, and which insulating layer further comprises passages each arranged with an electronic conductor, which electronic conductors each electronically connects a respective second pixel layer and said second electrode of a respective pixel cell. An advantage related to this embodiment is that it enables production with only a middle carrier layer.

According to one embodiment of the display device, said second pixel layer covers a center portion of said third pixel layer in each one of said pixel cells. In more detail, said second pixel layer and third pixel layer may be arranged such that the center of the respective layers coincide along a direction normal to said layers, said layers having a stacked configuration and are arranged in parallel with each other.

According to one embodiment of the display device the surface area of the second pixel layer in each pixel cell is at least 60%, or at least 75%, or at least 90%, or at least 95% of the surface area of the electrolyte. In other words, the second pixel layer may be arranged behind or covered by the electrolyte.

According to one embodiment of the display device the solidified electrolyte is a polycationic electrolyte. According to an alternative embodiment the solidified electrolyte is a polyanionic electrolyte.

According to one example the electrolyte is arranged such that it dissociates into smaller and substantially larger ion-complexes, where the smaller ion-complexes have a first electric charge and the larger ion-complexes have the opposite electric charge. The larger ion-complexes preferably comprise long polymer chains or large molecules, and are either cations or anions. In other words, according to one example the electrolyte is a polyelectrolyte or an oligomeric electrolyte comprising larger cation-complexes. According to an alternative example the electrolyte is a polyelectrolyte or an oligomeric electrolyte comprising larger anion-complexes.

Basically there is no limitation or restriction of the thickness of said first pixel layer of the pixel device, but in an embodiment it typically may be between 0.1 µm and 7 µm, mainly due to manufacturing and flexibility point of views, where the chosen thickness depends on the desired device property; a thinner layer normally equals a shorter switching time of the pixel device, while a thicker layer normally equals in higher colour contrast. Moreover, the thickness of said second pixel layer of the pixel device may in an embodiment be between 0.1 µm and 40 µm. When choosing the thickness of the layers the following may be kept in mind, a too thin second pixel layer could degrade the coloring performance of said first pixel layer and a too thick layer could reduce the bending resistance and/or the mechanical pressure resistance of the pixel device. Moreover, the thickness of said third pixel layer of the pixel device may in an embodiment be between 1 µm and 20 µm, or between 1 µm and 100 µm. Normally, the thinner the layer becomes, the better the flexibility, but the contrast decreases at the same time. The thickness of each pixel layer is measured along a viewing direction normal to the respective pixel layer. According to optional methods of providing the pixel layers, they may be provided by a number of conventional printing techniques, such as spin-coating, ink-jet printing, screen-printing, ionic self-assembled multilayer, aerosol-jet printing or bar-coating.

According to one example, a passage in said insulating layer is provided by means of laser techniques, preferably by means of laser-drilling. When the passage in the insulating layer is manufactured by means of drilling or laser-drilling, a material of sufficiently high melting point is preferably selected, such that the risk of damaging the area around the passage is minimized.

In an embodiment, the cross-sectional area of the passage of the pixel device may be e.g. between 10 µm$^2$ and 2 mm$^2$. According to another example the area is between 100 µm$^2$ and 0.5 mm$^2$. According to yet another example the area is between 500 µm$^2$ and 0.2 mm$^2$. According to yet another example the area is between 1000 µm$^2$ and 0.1 mm$^2$. The cross-sectional area is measured orthogonal to the extension of said passage, i.e. if the passage is shaped as a conventional hollow cylinder having a base of radius r, the cross-sectional area of the passage is pi*r$^2$. A relatively large cross-sectional area of the passage is advantageous in that it provides a higher level of electrical conductivity. However, too large cross-sectional area of the passage may cause problems during manufacturing, such as leakage of the third pixel layer through the passage.

For some manufacturing techniques, the electrical conductor provided in said passage is arranged only on the inner sides of said passage which implies that the electrical conductor has a hollow or tubular shape, having an inner and an outer perimeter, wherein at least said outer perimeter corresponding to the perimeter of said passage. Other arrangements of the electrical conductor in said passage are possible, as long as the conductor provides an electronic connection between said conducting column line and said second pixel layer.

In general, devices according to the invention are operated by applying a first potential to said first pixel layer, and a second potential different from said first potential to said second pixel layer, such that an electric field within said solidified electrolyte is created. The electric field initiates a redox reaction of said pixel layer, which reaction causes a colour change of said electrochromic material, provided that the potential is sustained long enough.

It is to be understood that the switching time or the colour change of the pixel device is in general determined by e.g.:
 the mobility of ions in the electrolyte, the higher the mobility the shorter the switching time;
 the magnitude of the ionic current in the electrolyte, which is determined both by the ion mobility in the electrolyte as well as the electrolyte volume;
 the choice of electrochemically active and/or electrochromic material;
 the volume of the electrochemically active and/or electrochromic material that needs to be reacted in order to alter the colour of the electrochromic material;
 the amplitude of the applied voltage; the higher the voltage the shorter the switching time, and vice versa.

A display having several separately addressable pixels may be provided by arranging a plurality of electrochromic pixel devices as described above. Advantageously, the pixel devices are arranged in a matrix arrangement which allows for the concept of passive matrix addressing.

Any appropriate, conventional or well-known protocol for addressing of passive matrix displays may be used to operate the present device. For instance: electrodes arranged in rows designate the electrochromic pixel elements or the first pixel layer, while electrodes arranged in columns designate the second pixel layer of the matrix display. Each respective row and column is connected to the output pin of a digital integrated circuit, which preferably can be driven by a supply voltage. The desired image to be presented by the display may be stored in a programmable circuit, which outputs the image by updating the whole display, either once or iteratively.

The matrix display is typically updated row by row, even though column by column scan or individual pixel scan are other available addressing alternatives. In the row by row scan, an output enable signal activates the respective row, such that the desired pixels can be updated by applying a voltage to the respective column line. The outputs of non-active rows and non-addressed columns are disabled. The output pin of an updated row is then set to output disable, and the subsequent rows are updated by the same methodology. In such addressing protocol the threshold voltage in combination with the disabled non-addressed rows and columns allows for updating of a passive-matrix display with minor cross-talk.

In another example the threshold voltage is taken advantage of in combination with an external circuit having only analog outputs. Here, it is assumed that full colorations in one pixel cell is achieved by applying the voltage V. An addressed row is then set to half this voltage, while an addressed column also is set to half this voltage but with opposite polarity. Hence, the total voltage across the pixel cell is V. Non-addressed rows and columns are set to ground. A pixel cell at the intersection of an addressed row and a non-addressed column, or a non-addressed row and an addressed column senses half of the updating voltage V. The threshold voltage in the respective pixel cell will therefore minimise cross-talk as long as the threshold voltage approximately corresponds to half the updating voltage V.

In relation to this invention the set of first electrodes and the set of second electrodes are sometimes exemplified by row and column electrodes. What is stated about the row and column electrodes may also be applied to a set of first electrodes and a set of second electrodes, even if these electrodes are not arranged in parallel and not arranged orthogonally to each other.

DEFINITIONS

Layer: according to one embodiment, the pixel device has a laminate structure and consists of "layers" of different materials. These layers can be continuous and/or patterned, and can be applied to each other (self-supporting device) or to a support or carrier (supported device). These terms, self-supporting/supported, may also be used for a separate layer. A self-supporting layer is a layer which may be handled on its own and e.g. mounted in a printing machine, without collapsing and without the need of additional supporting layers. Furthermore, the term layer may encompass all of the same material in the same plane, regardless whether this material is patterned or interrupted in such a way as to form discontinuous "islands" in the plane.

Insulating layer: the insulating layer preferably comprises plastic or is formed of a layer comprising plastic, a plastic insulating layer, a plastic film or plastic foil such as a polyester foil. As for the plastic insulating layer or the insulating layer comprising plastic, it may involve e.g. films, foaming films or laminated films thereof comprising, for example, polyolefin such as polyethylene, polypropylene or the like; polyester such as polyethylene terephthalate, polyethylene naphthalate, polybutylene terephthalate or the like; polyvinyl chloride, polystyrene, polyurethane, polycarbonate, polyamide, polyimide, poly methyl methacrylate, polybutene, polybutadiene, poly methyl pentene, ethylene-vinyl acetate copolymer, ethylene (meth) acrylic copolymer, ethylene (meth) acrylate copolymer, ABS resin, ionomer resin or the like, but is not limited to theses examples. Also, as for layers, commercial films can be used, and films formed by a cast film process using a process material may also be used.

Additionally, the display with several pixels may comprise a continuous layer of insulating material forming said insulating layer of at least some of said plurality of electrochromic pixel devices. In other words, the insulation layer of several pixels may each be a separate portion of a continuous insulation layer.

Electrochromic layer: an "electrochromic layer" in relation to this invention is a continuous geometrical body, which can be patterned to different shapes, and is composed of one material or a combination of materials. The material(s) may be organic or inorganic, low molecular or polymeric. Such an electrochromic layer, independent of whether it is composed of one material or is an ensemble of more than one material, combines the following properties: at least one material is electrically conducting in at least one oxidation state, and at least one material is electrochromic, i.e. exhibits colour change as a result of electrochemical redox reactions within the material. Optionally, the electrochromic layer may comprise an electrochemically active material.

Electrochemically active: an "electrochemically active" layer according to the present invention, is a piece of a material having an electronic conductivity that can be electrochemically altered through change of the redox state of said material. Normally, at least a portion of an electrochemically active element is in ionic contact with an electrolyte, and the electrochemically active element may furthermore be integrated with an electrode, being composed of the same or different materials. The electrode may also be arranged on top of said electrochemically active material.

Electrochromic display: an "electrochromic display" is in relation to this invention a device comprising at least one electrochromic pixel layer, which device is arranged such that a colour change of the electrochromic layer is visually detectable in reflection and/or in transmission.

Colour change: when reference is made to "colour change", this is also meant to include changes in optical density or reflectance, so that "colour change" for example takes into account changes from blue to red, blue to colorless, colorless to blue, dark green to light green, grey to white or dark grey to light grey alike.

Passive matrix: In active-matrix displays each pixel is equipped with an electronic circuit with at least one control element providing a transistor function. In other words, a passive-matrix display device, is a display device without a set of separate control elements, each control element being associated with a respective one of the pixel cells. The control element is further arranged to provide a transistor function capable of controlling the color of said pixel cell. Examples of control elements are field-effect transistors and electrochemical transistors. By separate is intended that the control layer arranged electrically upstream or downstream of said pixel cell.

Pixel layer: In relation to this invention the pixel layer is defined by the interface between the electrolyte and the electrically conductive layer. In more detail, the pixel layer is the volume of an electronically conductive layer, which on its one side is covered by electrolyte. When the pixel layer is an electrochromic layer, the colour change of the layer might not correspond to the extension of the interface between the electrolyte and the electrochromic layer, i.e. to what is defined as the pixel layer. The colour change might e.g. spread outside the interface between the electrolyte and the electrochromic layer, as well as through the electrochromic layer to the side opposite the one covered by electrolyte.

According to one example the electrolyte is sandwiched between an electrode layer comprising carbon and an electrode layer comprising an electrochromic and electrochemically active organic polymer, which electrode layers crosses or intersects each other at one point. As explained above, the pixel layer is defined by the respective interfaces between the electrodes and the electrolyte. In other words, the pixel layers coincide with a respective portion of the electrodes.

In optional embodiments of the pixel device, the electronic conductor may comprise an electron conductive material such as electronically conductive polymers such as PEDOT:PSS (poly(3,4-ethylenedioxythiophene)poly(styrenesulfonate)), carbon, inert metals or electrochemically inert metals such as gold, or other conducting material suitable for being in contact with electrochemically active layers, or combinations of such electron conductive materials. Normally, conducting material suitable for being in contact with electrochemically active layers are inert such that they do not give rise to substantial electrochemical reactions. These materials may e.g. be provided as an ink or paste which is arranged in the passage during a manufacturing, or pre-manufacturing process.

Electrodes: The electrodes may comprise any electron conducting material, such as electrically conducting polymers, metal, conducting carbon, titanium, platinum, graphite, graphene, noble metals and inert metals or combinations of such electron conductive materials. The electrodes may further comprise electrochemically inert metals such as gold or other conducting materials suitable for being in contact with electrochemically active layers. Normally, conducting material suitable for being in contact with electrochemically active layers are inert such that they do not give rise to substantial electrochemical reactions. These materials may e.g. be provided as an ink or paste which is arranged on said insulating film during a manufacturing, or pre-manufacturing process.

The electrodes are preferably elongated and may for example be band shaped or arranged as threads or thread shaped. The electrodes may for example be arranged of or comprise a layer of conductive polymers or arranged of or comprise metal threads or lines. According to one embodiment a first set of electrodes are arranged in parallel with each other in a first plane. A second set of electrodes are arranged in parallel with each other in a second plane, which second plane is different from said first plane, and wherein said first and second planes are arranged in parallel with each other. Preferably, the first and second planes are separated only by a small distance, which is at least equal to the height of the electrolyte. Further, the electrodes of said first and second sets are commonly arranged orthogonal to each other. According to other embodiments, the electrodes of said first and/or second set of electrodes are not arranged in parallel with each other, or the first and second planes are not arranged in parallel with each other. Further, the electrodes may be arranged in straight lines but may also be curved and have irregular shapes. In other words, the pixel cells which are arranged in a matrix are not necessarily arranged in straight rows and columns, but may be arranged in a more irregular way, as long as each electrode in said first set of electrodes only intersects each electrode in said second said of electrodes at one intersection point only.

Direct electrical contact: Direct physical contact (common interface) between two phases (for example between electrochemically active organic material and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example counter element and electrolyte or electrolyte and electrochromic element, or by occurrence of capacitive currents due to the charging of the Helmholtz layer at such an interface.

Ionic contact between two elements is provided by at least one material capable of transporting ions between the two elements. An electrolyte, in direct contact (common interface) with a first and a second electrochemically active layer, is one example of a material which may provide ionic contact between the two electrochemically active layers. The electrolyte may hence be referred to as being in ionic contact with the two electrochemically active layers.

Two materials may be in electronic contact with each other, e.g. via a third material. Electronic contact between two elements is provided by at least one material capable of transporting electrons between the two elements. A layer of carbon, in direct contact (common interface) with a first and a second electrochemically active layer, is one example of a material which may provide electronic contact between the two layers. The layer of carbon may hence be referred to as an electronic conductor, or electronically conductive.

Direct electronic contact: Direct physical contact (common interface) between two electronic conductors.

The electrochromic pixel device may comprise, as electrochromic material and/or electrochemically active material, a polymer which is electrically conducting in at least one oxidation state, and optionally also comprises a polyanion compound.

Electrochromic polymers for use in the electrochromic pixel device of the invention are for example selected from the group consisting of electrochromic polythiophenes, electrochromic polypyrroles, electrochromic polyanilines, electrochromic polyisothianaphthalenes, electrochromic polyphenylene vinylenes and copolymers thereof. In an embodiment, the electrochromic polymer is a homopolymer or copolymer of a 3,4-dialkoxythiophene, in which said two alkoxy groups may be the same or different or together represent an optionally substituted oxy-alkylene-oxy bridge. In yet an embodiment, the electrochromic polymer is a homopolymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly (styrene sulfonate).

As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behavior. For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT-PSS, being electrochromic as well as both electrically and ionically conducting; a piece of PEDOT-PSS with $Fe^{2+}$/$SCN^-$, PEDOT-PSS being conducting and electrochromic as mentioned above and $Fe^{2+}$/$SCN^-$ being an additional electrochromic component (see below); a piece composed of a continuous network of conducting ITO particles in an insulating polymeric matrix, in direct electrical contact with an electrochromic WO3-coating; a piece composed of a continuous network of conducting ITO particles in an insulating polymeric matrix, in contact with an electrochromic component dissolved in an electrolyte. As described above, an electrochromic pixel device may comprise a further electrochromic material for realization of displays with more than one colour. This further electrochromic material can be provided within the electrochromic pixel element or the solidified electrolyte, which then for example comprises an electrochromic redox system, such as the redox pair of colorless $Fe^{2+}$ and SCN– ions on one hand, and of red $Fe^{3+}(SCN)(H2O)_5$ complex on the other. By way of further, non-limiting example, such materials may be selected from different phenazines such as DMPA—5,10-dihydro-5,10-dimethylphenazine, DEPA—5,10-dihydro-5,10-diethylphenazine and DOPA—5,10-dihydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, p-ethoxychrysoidine, methylene blue, different indigos and phenosafranines, as well as mixtures thereof.

Solidified electrolyte: for the purposes of the invention, "solidified electrolyte" means an electrolyte, which at the temperatures at which it is used is sufficiently rigid that particles/flakes in the bulk therein are substantially immobilized by the high viscosity/rigidity of the electrolyte and that it does not flow or leak. In the preferred case, such an electrolyte has the proper rheological properties to allow for application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte may for example comprise an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochromic device is arranged, so that the support forms an integral part of the operation of the electrochromic device.

The solidified electrolyte may comprise a binder. It is preferred that this binder have gelling properties. The binder may be selected from the group consisting of gelatine, a gelatine derivative, polyacrylic acid, polymethacrylic acid, poly(vinylpyrrolidone), polysaccharides, polyacrylamides, polyurethanes, polypropylene oxides, polyethylene oxides, poly(styrene sulphonic acid) and poly(vinyl alcohol), and salts and copolymers thereof; and may optionally be cross-linked. The electrolyte may be formed by one of the materials listed above or by a combination of two or more of these materials.

In summary, the material selection and the vertical architectural configuration of the pixel device according to the present invention allow for a manufacturing process comprising conventional printing techniques. Such conventional printing techniques may encompass bar coating, screen printing, spin-coating, ink-jet printing, aerosol-jet printing, or any other such manufacturing procedure. The architecture of the pixel device also allow for use of manufacturing procedures that are easily scalable to larger scale manufacturing, which, in turn, allow for faster and low price manufacturing. For example, a display arrangement comprising a plurality of pixel devices according to the present invention may be manufactured in a roll-to-roll manufacturing procedure.

In an embodiment of the pixel device the conducting column line, the electronic conductor in said passage, the second pixel layer, the third pixel layer and the first pixel layer can be arranged by means of printing techniques. Hence, the electronic conductor, which provides the electronic link between the said second pixel layer and the conducting column line may preferably be arranged of or comprises a material comprising printable material in order to facilitate manufacturing, i.e. a material which e.g. have suitable rheological properties in order to be printable. Inks comprising electrically conductive polymers or conducting carbon are examples of such printable materials. During manufacturing of the pixel device, the electronically conductive material may be arranged in said passage by a number of different printing techniques, such as bar-coating, screen-printing, inkjet printing, aerosol-jet printing, spin-coating etc., or by applying the material at the passage and pressing it into said passage, for example by pulling a squeegee across said passage. It should also be understood that the insulating layer having the passages arranged with the electronic conductor may be pre-fabricated or partly pre-fabricated. For example, the passages and the electronic conductor may be applied or arranged during a pre-manufacturing process.

Generally, other objectives, features, and advantages of the present invention will appear from the following detailed disclosure, from the attached dependent claims as well as from the drawings. Embodiments of the invention will now be described, by way of example, with reference to the accompanying drawings. It should be understood that the drawings are not true to scale and, as is readily appreciated by a person skilled in the art, dimensions other than those illustrated in the drawings are equally possible within the scope of the invention.

BRIEF DESCRIPTION OF THE DRAWINGS

FIG. 1a schematically illustrates an exploded perspective view of a passive matrix display, wherein the pixel layer and the electrodes coincide.

FIG. 1b schematically illustrates a cross-sectional view of a pixel in a pixel device arranged as described in relation to FIG. 1a.

FIG. 2a schematically illustrates an exploded perspective view of a passive matrix display, wherein the first pixel layer and the first electrode coincide.

FIG. 2b schematically illustrates a cross-sectional view of a pixel in a pixel device arranged as described in relation to FIG. 2a.

FIG. 3b schematically illustrates a cross-sectional view of a pixel in a pixel device arranged as described in relation to FIG. 3a.

DETAILED DESCRIPTION

Figure 3A:
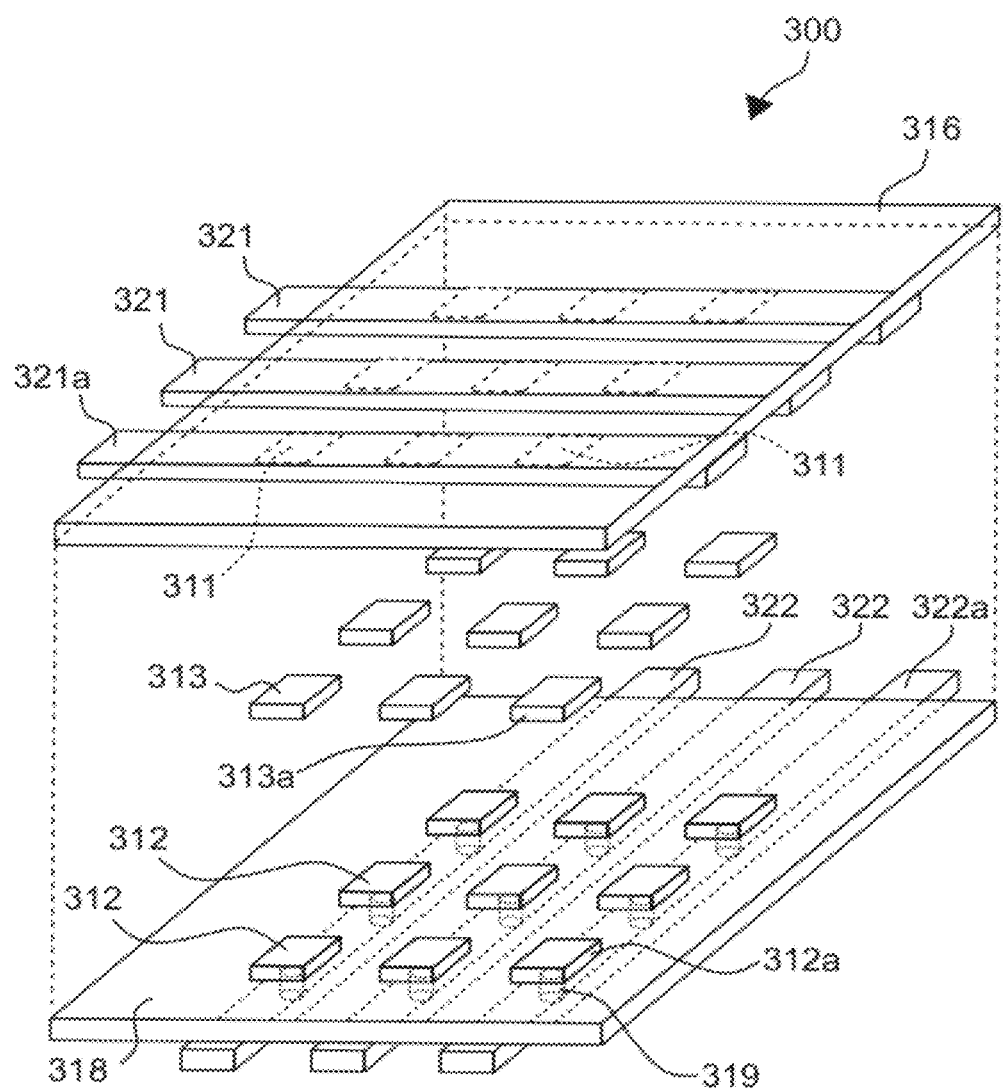
FIG. 3a schematically illustrates an exploded perspective view of a passive matrix display, comprising an insulating layer having passages.

One example of a passive matrix display according to the invention is schematically illustrated in FIGS. 1a and 1b. FIG. 1a is an exploded perspective view of a passive matrix display, wherein the pixel layer and the electrodes coincide. A set of first electrodes 121 of electrochromic material, as well as a set of second electrodes 122 comprising carbon are provided. Each electrode is formed as a straight elongated element. The first electrodes 121, i.e. the electrodes in said set of first electrodes, are arranged in parallel with each other in a common first plane. The second electrodes 122, i.e. the electrodes in said set of second electrodes, are arranged in parallel with each other in a common second plane. Further, the two sets of electrodes 121, 122, are arranged in relation to each other, such that each of said first electrodes intersect each of said second electrodes at only one intersection. In FIG. 1, the first electrodes are arranged orthogonally to said second electrodes, i.e. the electrodes intersects each other at an angle of 90 degrees. Alternatively, the electrodes may be arranged to intersect each other at almost any other angle, sufficiently deviating from 0 and 180 degrees, e.g. within an interval of 10° to 170°.

At each of the intersections between said first and second electrodes, there is a layer of electrolyte 113 arranged spatially between the two electrodes. In other words, the electrolyte 113 is sandwiched between a first electrode 121a of said set of first electrodes and a second electrode 122a of said set of second electrodes. Further, a first pixel layer 111 is defined by the extension of the interface between the electrolyte 113 and the first electrode 121a. A second pixel layer 112 is defined by the extension of the interface between the electrolyte 113 and the second electrode 122a. In other words, said first pixel layer 111 coincides with a portion of said first electrode 121a; and said second pixel layer 112 coincides with a portion of said second electrode 122a. In more detail, said first pixel layer 111 and said second pixel layer 112 constitutes the whole volume of said first 121a and second 122a electrodes, respectively.

According to one embodiment, said set of first electrodes are arranged on a first carrier layer 116, and said set of second electrodes are arranged on a second carrier layer 117. The first and second carriers are preferably arranged of or comprise insulating material. When manufacturing the pixel device, electrolyte may be arranged on one or both of the electrodes at their respective intersections. Thereafter, the carriers are brought together, such that an ionic connection is provided at the intersection between a respective first and second electrode.

FIG. 1b illustrates a close up of a schematic cross-sectional view of one pixel in a pixel device arranged as described in relation to FIG. 1a. The layers of the pixel have a vertical or stacked arrangement. In more detail, an electrolyte 113 is sandwiched between a first pixel layer 111 comprising electrochromic material and a second pixel layer 112 comprising carbon. Further, the first pixel layer is arranged spatially between a first substrate 116 and the electrolyte 113; and the second pixel layer is arranged spatially between a second substrate 117 and the electrolyte. The viewing direction of said pixel is normal to said first carrier layer, and indicated by an arrow 130.

FIG. 2a schematically illustrates an exploded perspective view of a passive matrix display. The pixel device 200 illustrated in FIG. 2a is arranged as described in relation to FIGS. 1a and 1b, except that said second pixel layers do not coincide with said second electrodes. Instead, said second pixel layer 212 is a separate layer comprising conducting carbon, arranged spatially between the second electrode 222a and the electrolyte 213 at the intersection between said first and second electrodes 221a, 222a. Further, the second pixel layer is arranged in direct electric contact with said second electrode 222. The second electrode may be arranged of or comprises the same material as said second pixel layer, or a material having higher electron conductivity such as silver. In more detail, at each intersection between a first electrode 221a and a second electrode 222a, a respective layer of electrolyte 213 and a second pixel layer 212 of carbon material are stacked on each other, and arranged between said first and second electrodes 221a, 222a; such that said pixel layer 212 is in direct electronic contact with said second electrode 222a, and said electrolyte 213 is in ionic contact with both said second pixel layer 212 and said first pixel layer 211 of electrochromic material of said first electrode 221a.

In more detail, and according to one embodiment, said set of first electrodes 221 are arranged on a first carrier layer 216, and said set of second electrodes 222 are arranged on a second carrier layer 217. The first and second carrier layers 216, 217 are preferably arranged of or comprise insulating material. Further, a second pixel layer 212 of carbon is arranged on said second electrode 222a at each or some intersections between said first and second electrodes 221, 222. Further, a layer of electrolyte 213 may be arranged on one or both of the first and second electrodes at their respective intersections. Thereafter, the carriers are brought together, such that an ionic connection is provided between the first and second pixel layer 211, 212 at the intersection between a respective first and second electrode 221a, 222a.

FIG. 2b is a close up of a schematic cross-sectional view of one pixel in a pixel device arranged as described in relation to FIG. 2a. The layers of the pixel have a vertical or stacked arrangement. In more detail, an electrolyte 213 is sandwiched between a first pixel layer 211 comprising electrochromic material and a second pixel layer 212 comprising carbon. Further, the first pixel layer 211 is arranged spatially between a first substrate 216 and the electrolyte 213; and the second pixel layer 212 is arranged spatially between a second electrode 222 and the electrolyte 213.

Moreover, the second electrode is arranged spatially between the second pixel layer and a second carrier layer 217. The viewing direction of said pixel is normal to said first carrier layer, and indicated by an arrow 230.

FIG. 3a schematically illustrates an exploded perspective view of a passive matrix display. The pixel device 300 illustrated in FIG. 3a is arranged as described in relation to FIGS. 2a and 2b, except that said second pixel layer 312 is not in direct electronic contact with said second electrode 322. Instead, an insulating layer 318 comprising passages 319 is arranged between said second pixel layer 312 and said second electrode 322. Electronic conductors 320 are arranged in each of said passages 319. Further, the insulating layer is arranged such that each of the electronic conductors 320 electronically connects the second electrode 322 and the second pixel layer 312.

In more detail, and according to one embodiment, a first carrier layer 316 of insulating material is provided, whereon a set of first electrodes 321 are arranged. Further, an intermediate carrier layer 318 of insulating material is provided, and a set of passages 319 are arranged therein. A set of second electrodes 322 are arranged on a first side of said intermediate carrier layer 318, and an electronic conductor 320 is provided in said passage 319. Moreover, a set of second pixel layers 312 comprising conductive carbon are provided on the opposing side of said intermediate carrier layer 318, and each of said second pixel layers 312 are arranged in electronic contact with a respective one of said electronic conductors 320, such that each electronic conductor 320 electronically connects a respective second pixel layer 312a with its corresponding second electrode 322a. In all embodiments, the second pixel layers are arranged isolated from each other. A third pixel layer comprising electrolyte 313 is arranged on each one of said second pixel layers 312. Thereafter, the first and intermediate carriers 316, 318 are brought together, such that each of said first electrodes 321 intersects each of said second electrodes 322 at only one intersection. The first and intermediate carriers 316, 318 are brought together in such a manner that an ionic connection is provided between a respective one of said first electrodes 321a and a respective one of said second pixel layers 312a via a respective one of said third pixel layers 313 at a respective intersection between a first electrode 321a and 322a. The ionic contact between the set of third pixel layers 313 and the first electrodes 321 provides a set of first pixel layers 311 as described above.

Additionally, or alternatively, before the first and intermediate carrier layers 316, 318 are brought together, said third pixel layer may be provided in ionic contact with said first electrodes 321 at positions corresponding to predetermined intersections between the respective pairs of said first and second electrodes 321, 322. Thereafter, the first and intermediate carriers 316, 318 are brought together in such a manner that an ionic connection is provided between a respective one of said first electrodes 321a and a respective one of said second pixel layers 312a via a respective one of said third pixel layers 313 at a respective intersection between a first and second electrode 321a, 322a.

Figure 3B:
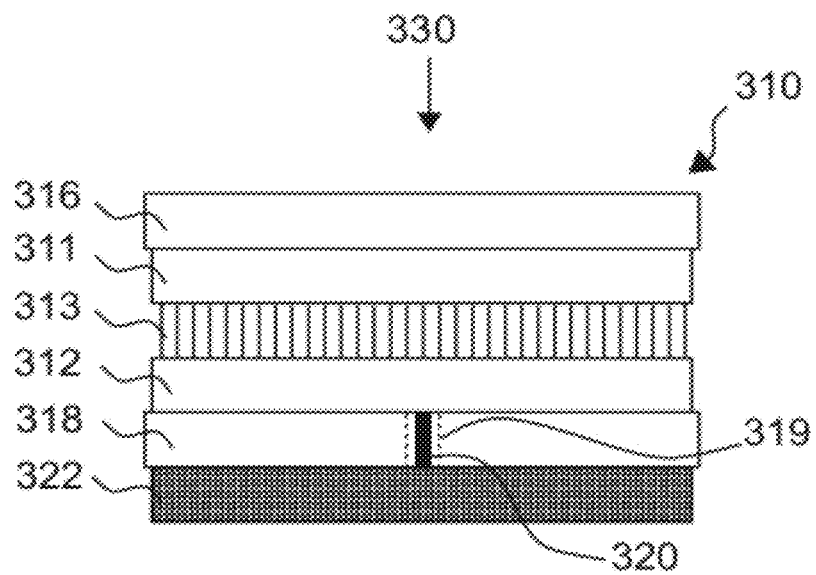

FIG. 3b is a close up of a schematic cross-sectional view of one pixel in a pixel device arranged as described in relation to FIG. 3a. The layers of the pixel have a vertical or stacked arrangement. In more detail, an electrolyte 313 is sandwiched between a first pixel layer 311 comprising electrochromic material and a second pixel layer 312 comprising carbon. Further, the first pixel layer 311 is arranged spatially between a first insulating layer 316 and the third pixel layer 313. Moreover, a second insulating layer 318 comprising a passage 319 is arranged between said second pixel layer 312 and said second electrode 322, and an electronic conductor 320 is arranged in said passage 319, which electronic conductor electronically connects said second pixel layer 312 and said second electrode 322. Optionally, the second pixel layer 312 may be arranged between said second insulating layer and an additional insulating layer, not illustrated in FIGS. 3a and 3b.

Figure 4:
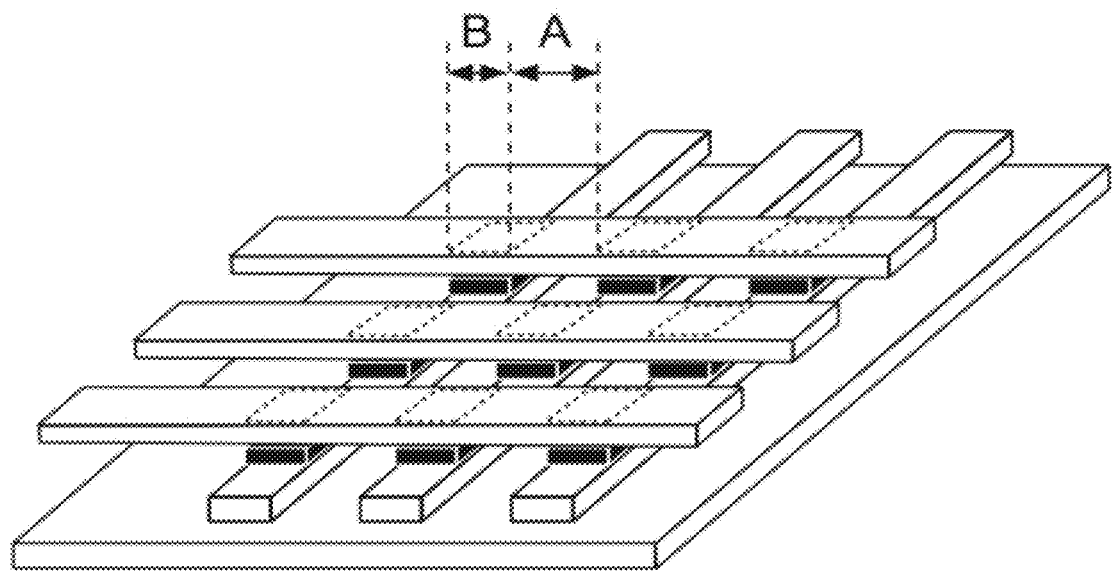
FIG. 4 illustrates the parameters used for computing the fill factor of a display.
Figure 5:
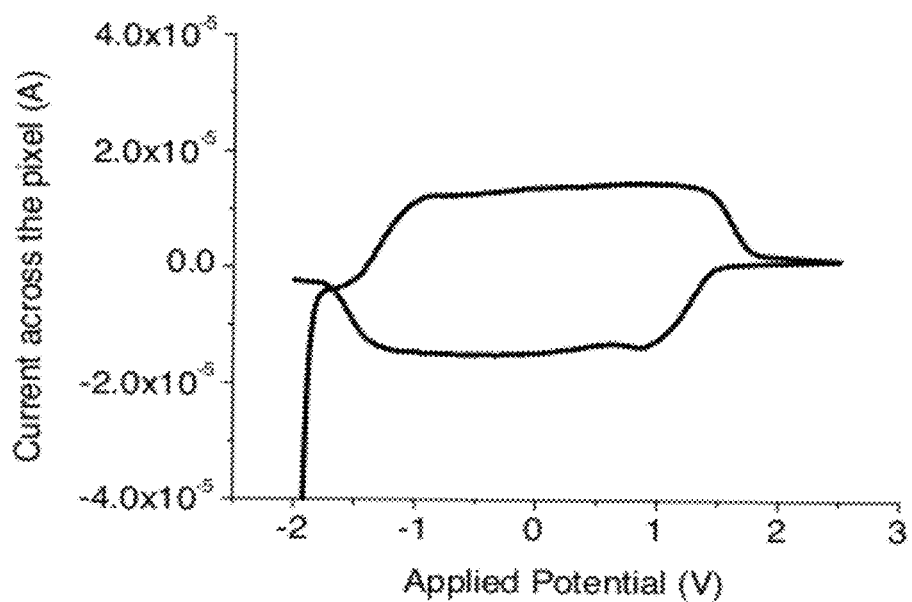
FIGS. 5-9 illustrates the I-V characteristic of different samples arranged according to the invention.

FIG. 4 schematically illustrates a display comprising a set of pixel cells arranged in a matrix, arranged as described in relation to FIGS. 1a and 1b. A plurality of pixel portions are arranged in a matrix configuration, wherein each pixel portion defines a pixel device as described in relation to FIG. 1b. A common property of measuring a display relates to the fill factor. The fill factor is associated with the effective area of each pixel in comparison with the given area of the complete display. The fill factor may be derived from the illustrated dimensions A and B. The distance A corresponds to the distance between two separate pixel portions and is indicative of how close two pixels are placed or of how large ineffective area there is in the display. The distance B illustrates the typical dimensions of a pixel portion which corresponds to the cross-sectional area of the pixel element. Generally, a relative decrease of the distance A implies an increase of the fill factor, and a relative increase of the area B implies an increase of the fill factor. In an embodiment, the fill factor of a display comprising pixel devices according to the present invention may be 90%, based on an individual pixel portion area of 1×1 mm$^2$.

Preparation of a Passive Matrix Addressed Display with Insulating Layer

An insulating layer, comprising 50 µm thick Polyethylene Terephthalate (called PET hereinafter) film (Melinex 454 manufactured by DuPont Teijin film) was provided, in which passages were created by laser irradiation in a 20×20 reticular pattern, where the distance between two neighboring passages was 1 cm. The entrance diameters of the passages were ~30 µm on the first side of said insulating layer, and ~70 µm on the other side of said insulating layer. An electrically conducting carbon paste (7102 screen printing carbon paste manufactured by DuPont) was deposited into the passages by using a squeegee. After drying the carbon paste at 120° C. for 3 minutes, the carbon deposition process step was repeated once to ensure electronic conduction through the passages. On a first side of said insulating layer, 20 parallel lines of silver paste (Ag 5000 screen printing silver paste manufactured by DuPont) were deposited by brush, where each line is ~2-3 mm wide and >200 mm long, such that each line electrically connects 20 passages in said insulating layer. The silver lines were then thermally treated; 120° C. for 5 minutes. On a second side of said insulating layer, conductive carbon paste (7102) was deposited to form squares, each having an area of ~4-5 mm$^2$, on top of said passages. The carbon squares, which served as the counter electrode elements in the electrochromic pixel devices, were then dried at 120° C. for 3 minutes. 20×20 electrolyte drops (Luviquat Excellence manufactured by BASF including 10 wt.-% of TiO2 powder (Kronos 2300 manufactured by KRONOS)) were deposited onto the carbon squares and dried at 60° C. for 1 minute. Luviquat is a copolymer of vinylpyrrolidone and quaternised vinylimidazole in aqueous solution. The TiO$_2$ was used in order to make the electrolyte sufficiently opaque. PET-foil with pre-coated PEDOT:PSS (Orgacon EL-350 manufactured by AGFA) was provided. The PEDOT:PSS layer was patterned by a knife plotter tool into 20 rectangles, each rectangle having an area of 23×1 cm$^2$. The PEDOT:PSS rectangles served as the first electrode and first pixel layer in the resulting matrix display. 20×20 electrolyte drops were deposited, according to the same reticular pattern of electrolyte drops on the second electrode, and dried at 60° C. for 1 minute. As the final process step, the second electrode and the first pixel layer are laminated such that the layers are facing each other in a vertical structure and that the conducting silver lines and the conducting PEDOT:PSS rectangles are oriented in an orthogonal fashion. The latter ensures a matrix display comprising rows and columns.

Preparation of Example Device and Reference Devices

An electrochromic pixel device can be manufactured by using the same materials (carbon paste, PEDOT:PSS and electrolyte) and substrate (PET-foil) that was used for the matrix display mentioned above. The conducting line comprising silver is not required in a single pixel device.

According to a first example of the pixel device, carbon paste (7102 by DuPont) and PEDOT:PSS paste (Clevios S V3 screen printing paste provided by H. C. Starck) was screen printed onto the respective PET-foil substrate, each deposited layer having an area of 35×35 $mm^2$, and then dried at 110° C. for 5 and 2 minutes, respectively. Then an electrolyte layer, having an area of 2×2 $mm^2$, was deposited at the corner of the respective pre-coated substrate, one electrolyte pattern for each substrate. After drying the electrolyte layers at 60° C. for 1 minute, the pixel device was completed by laminating the layers into a vertical structure, wherein the sandwiched electrolyte ensures the ionic connection between the first and second pixel layers.

A second example of the pixel device was prepared having the same device architecture as the first example, except that another kind of carbon paste (PF-407A manufactured by Acheson) was utilized, which was deposited onto said second pixel layer instead of the 7102 carbon paste.

A third example of the pixel device was prepared having the same device architecture as said first example, except that a PET-foil comprising pre-coated PEDOT:PSS (Orgacon El-350 manufactured by AGFA) was utilized as said first pixel layer.

A first reference sample was prepared having the same device architecture as said first example, except that the carbon counter electrode was exchanged for an electrode comprising PEDOT:PSS.

A second reference sample was prepared having the same device architecture as said first example, but wherein the carbon counter electrode was exchanged for a silver paste electrode (Ag 5000 manufactured by DuPont).

Measuring Electrochemical Device Properties

The I-V characteristics of electrochromic pixel devices were measured by connecting them to a semiconductor parameter analyzer (Hewlett Packard/Agilent 4155B). Sample pixels were prepared by providing matrix displays, arranged as described in relation to FIGS. 1a and 1b, and isolating each sample pixel from the rest of the pixels in the matrix display. The potential was connected to the second pixel layer, while the first pixel layer was connected to ground. The potential starts at a negative value (the first pixel layer is oxidized) and is swept to a positive value (the first pixel layer is reduced) and then back to a negative value again, for example −2V to 2V to −2V. The applied potential was increased by 10 mV every 20 ms. In other words, the pixel electrode layer switches from its initial transparent oxidized state to its blue colored reduced state and then back to the transparent oxidized state, and the current flow through the pixel device is recorded continuously by the parameter analyzer. The color of the electrolyte remains the same or non-switched through the whole measurement cycle.

Test Results

Figure 6:
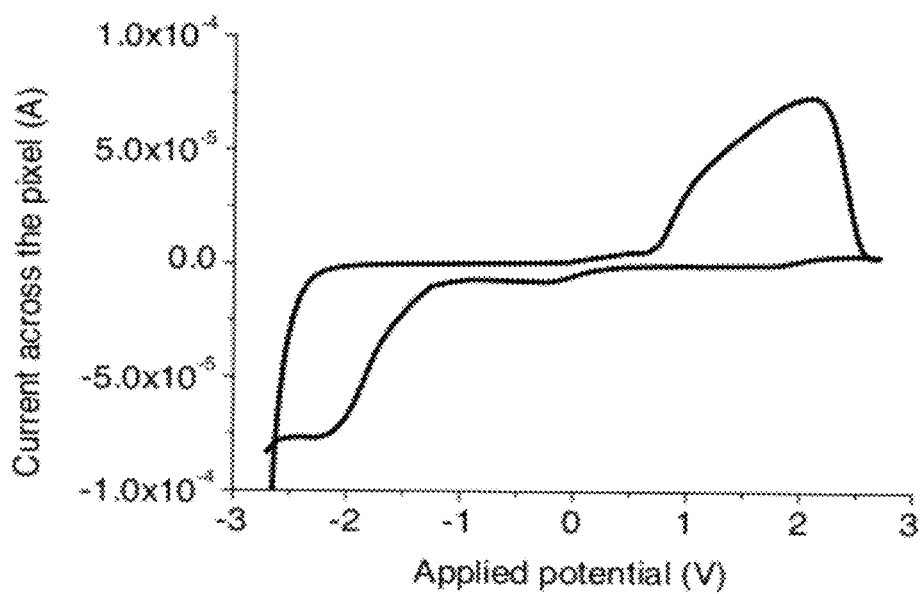
Figure 7:
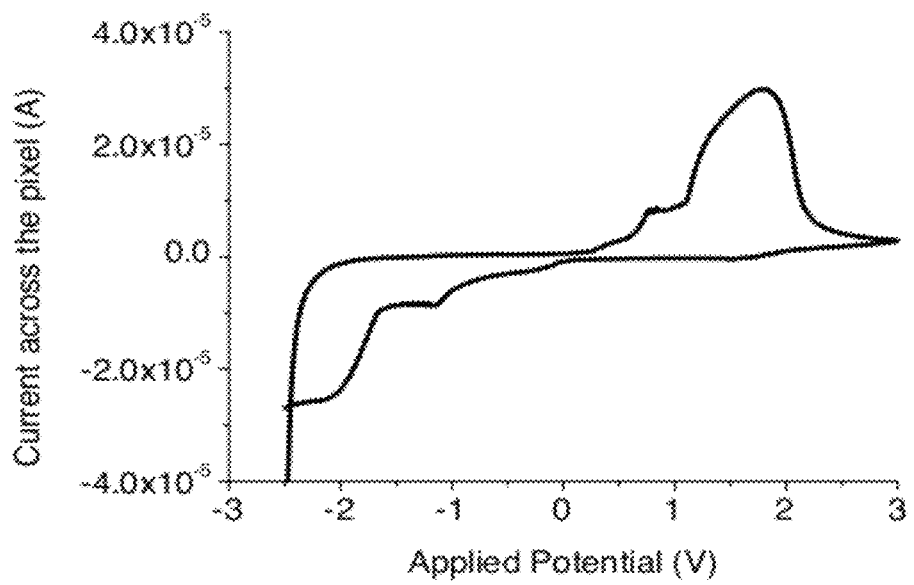
Figure 8:
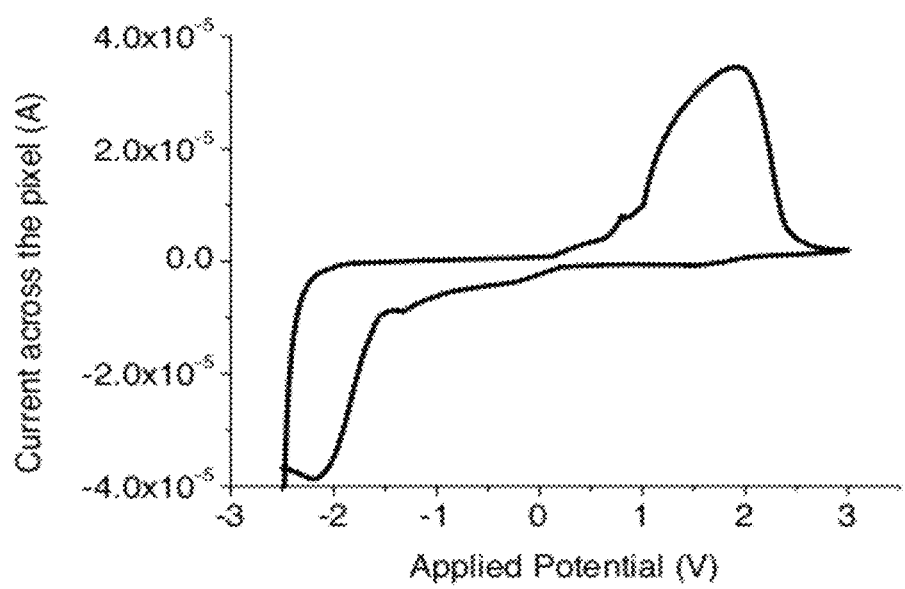
Figure 9:
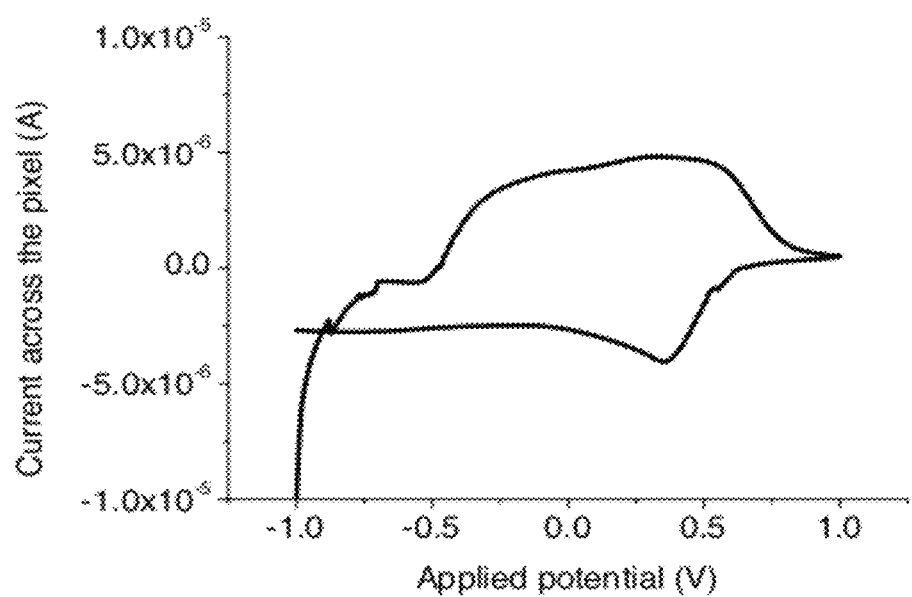

The I-V curves or the I-V characteristics of the first reference sample, the first, second and third examples, and the second reference sample of the pixel device, are shown in FIGS. 5, 6, 7, 8 and 9, respectively. Both reference samples, FIGS. 5 and 9, which lack a carbon counter electrode, show no voltage threshold behaviour since the current increases/decreases, more or less, linearly with the applied potential. The sample in FIGS. 5 and 9 comprises PEDOT:PSS and silver as the counter electrode, respectively. On the other hand, the pixel device embodiments in FIGS. 6, 7 and 8 show voltage threshold potentials at around 0.5-1.0V. Such voltage threshold potential could be taken advantage of in a matrix display driven by passive matrix addressing.

Figure 11:
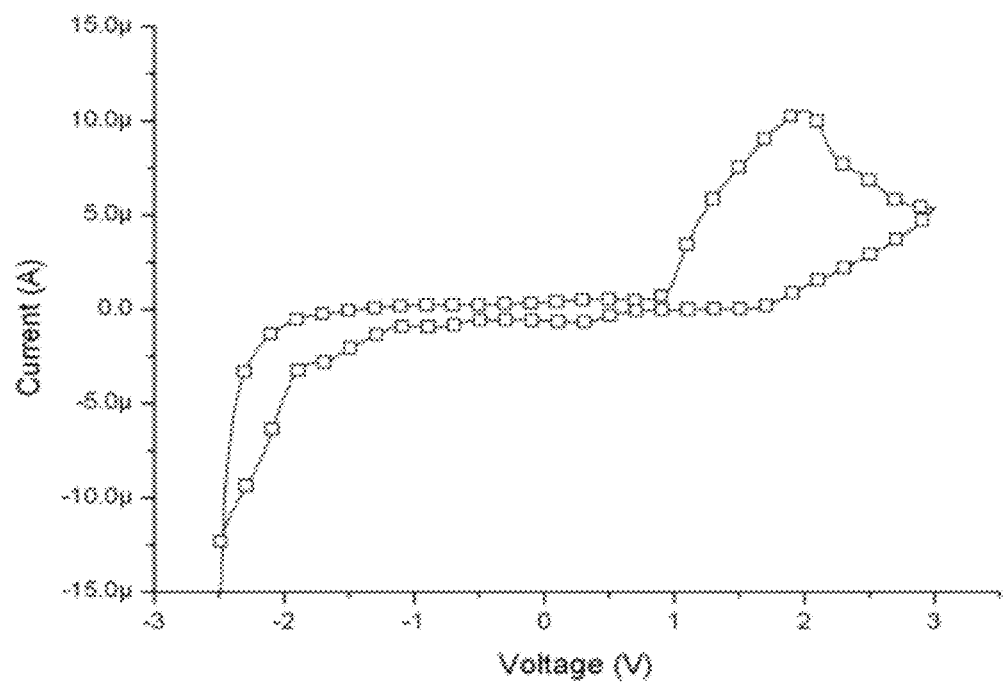
FIGS. 11-14 illustrate the I-V characteristic of different samples, comprising different electrolytes, arranged according to the invention.

FIGS. 11-14 show I-V curves or the I-V characteristics of example samples of the pixel device, comprising different electrolytes 113. The sample devices for which I-V curves are illustrated in FIGS. 11-14 are arranged as described in relation to FIGS. 1a and 1b, wherein each sample pixel has been isolated from the rest of the pixels in the matrix display. Further, the first pixel layer 111 of each pixel 110 comprises PEDOT:PSS as the electrochromic material and the second pixel layer 112 comprises carbon. The electrolyte for the sample of pixel device for which I-V curves is illustrated in FIG. 11 is Poly(diallyldimethylammonium chloride), an aqueous polycation electrolyte solution. Such a pixel device shows a threshold voltage at around ±1.0V. In addition, the example embodiment has a low leakage current at 0V. Thus, such a pixel device is usable in a matrix display driven by passive matrix addressing.

Figure 12:
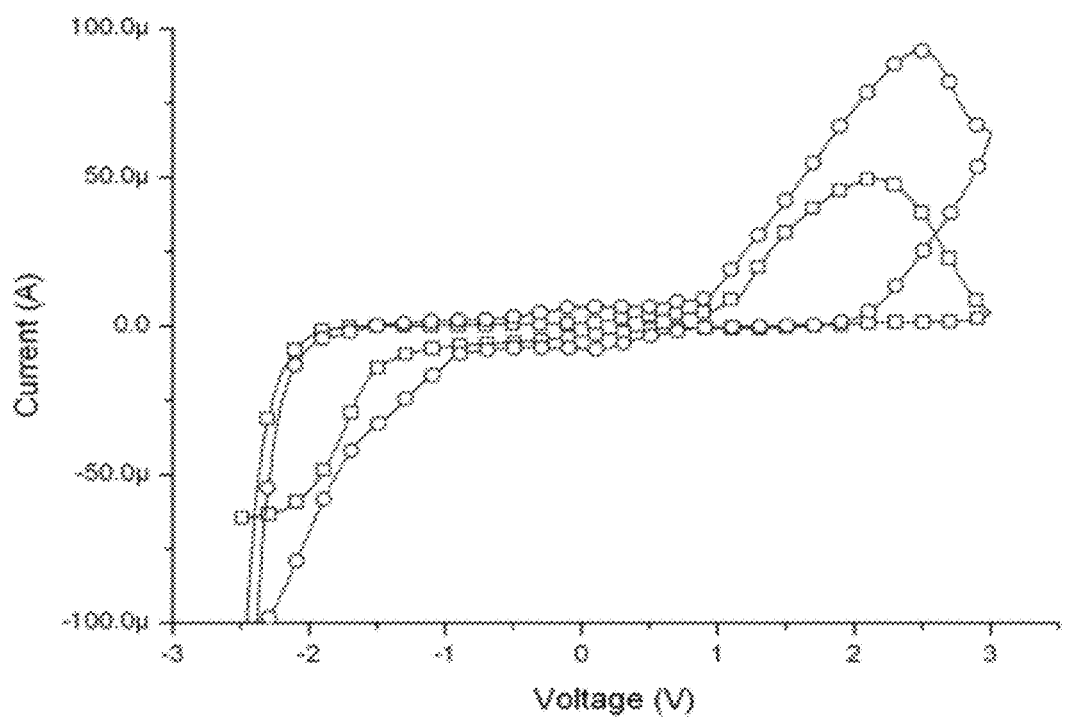

FIG. 12 shows I-V curves for two different embodiments of samples. The graph denoted by squares refers to a sample comprising a copolymer of vinylpyrrolidone and quaternized vinylimidazole (Luviquat® provided as an aqueous solution by BASF) as the polycation electrolyte. The graph denoted by circles refers to a sample comprising an aqueous solution of polystyrene sulfonate sodium salt as the polyanion electrolyte (M.W.~70,000, provided by Alfa Aesar). Both example devices corresponding to the graphs in FIG. 12 shows threshold voltages at around ±1.0V and low leakage currents at 0V. Thus, such pixel devices are also usable in a matrix display driven by passive matrix addressing.

Figure 13:
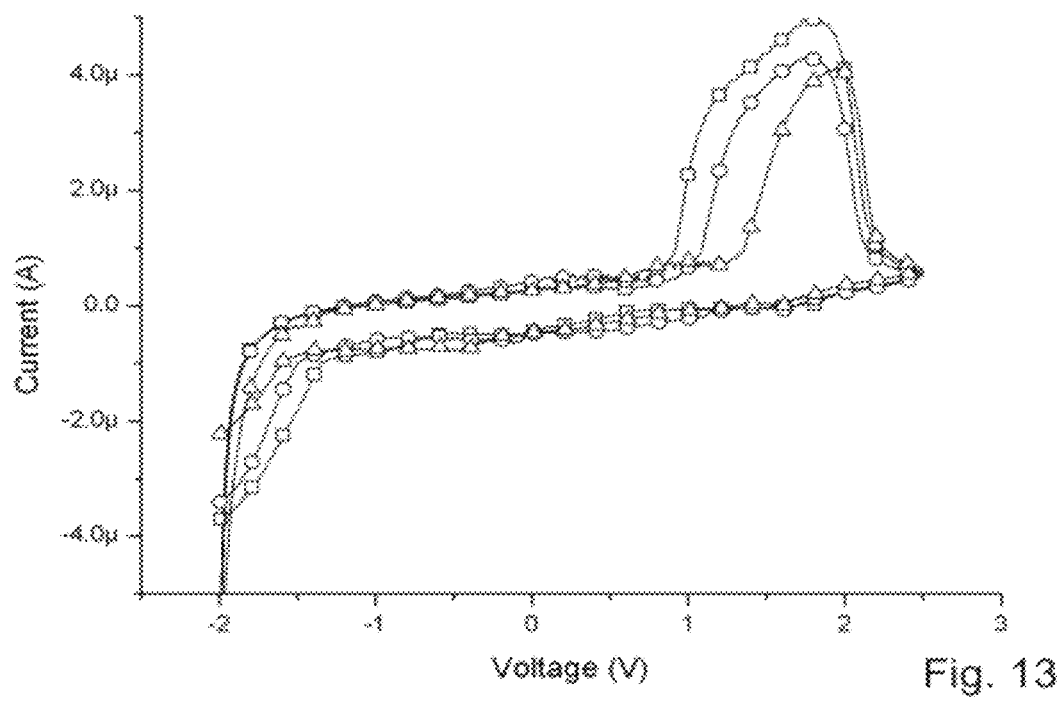
Figure 14:
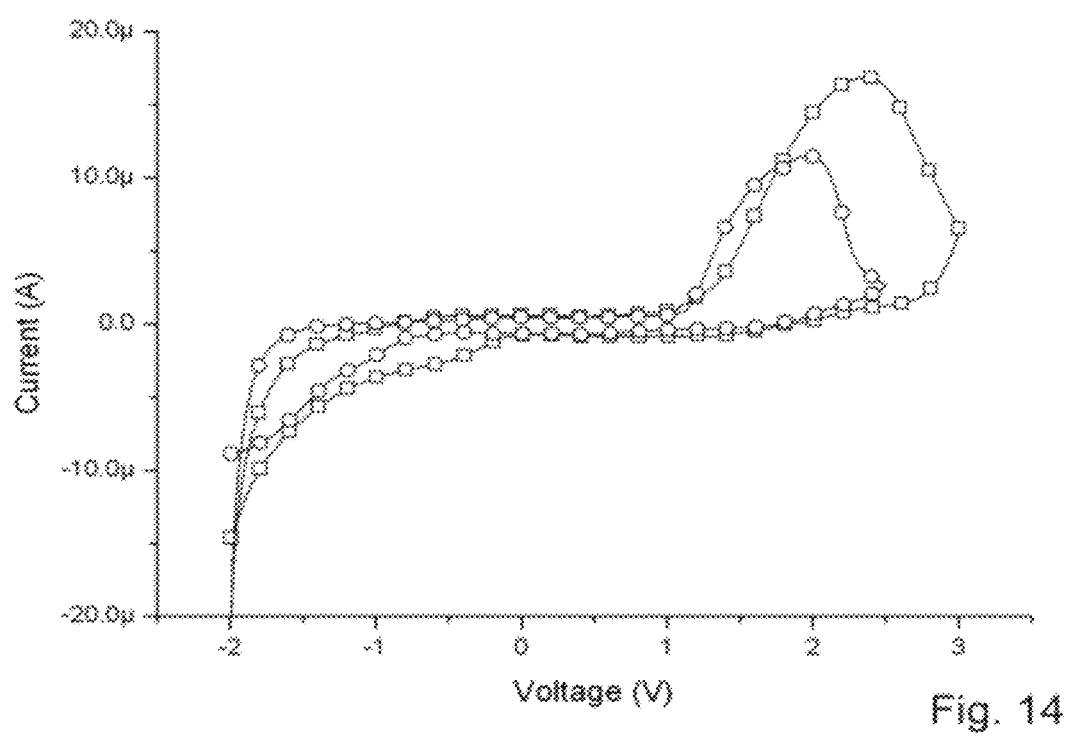

FIGS. 13 and 14 shows I-V curves for samples comprising a copolymer of vinylpyrrolidone and quaternized vinylimidazole (Luviquat® provided as an aqueous solution by BASF) as the polycation electrolyte. However, the electrolyte of each pixel device comprises different additives. The aim of the additives in the electrolytes of the pixel devices resulting in the curves in FIG. 13 is for enabling printability and curability. The graph denoted by squares refers to a sample with an electrolyte having the proportions Luviquat:DL-lactic acid being 100:18.5 wt. ratio. The graph denoted by circles refers to a sample with an electrolyte having the proportions Luviquat:DL-lactic acid:glycerol 1,3-diglycerolate diacrylate being 100:18.5:2.7 wt. ratio. The graph denoted by triangles refers to a sample with an electrolyte having the proportions Luviquat:glycerol 1,3-diglycerolate diacrylate being 100:10 wt. ratio. Thus, additives such as DL-lactic acid and glycerol 1,3-diglycerolate diacrylate can be used as additives to the Luviquat for obtaining curability and printability, with maintained threshold voltage required to enable addressability in passive-matrix displays.

For the pixel devices resulting in the I-V curves of FIG. 14, the additives are glycerol 1,3-diglycerolate diacrylate (purchased from Sigma-Aldrich), DL-lactic acid (purchased from Sigma-Aldrich), Irgacure 2959 (2-Hydroxy-4'-(2-hydroxyethoxy)-2-methylpropiophenone 98%, purchased from Sigma Aldrich), TPO (diphenyl(2,4,6-trimethylbenzoyl)phosphine oxide, Lucirin TPO, provided by BASF), TiO2 and water. The graph denoted by squares refers to a sample with an electrolyte having the proportions Luviquat: glycerol 1,3-diglycerolate diacrylate:DL-lactic acid:Irgacure 2959:TPO:TiO2 at a wt. ratio equal to 100:3:1.9: 0.21.0.17.10. The graph denoted by circles refers to a sample with an electrolyte having the proportions Luviquat:glycerol 1,3-diglycerolate diacrylate:DL-lactic acid:Irgacure 2959: TPO:TiO2:water at a wt. ratio equal to 100:10.8:18.5:0.77: 0.62:92:19.2. Irgacure 2959 and TPO are photo initiators to enable UV-curing of the electrolyte layer and TiO2 particles can be used as an opacifying layer in pixels operating in reflective mode. The graphs indicate that these additives can be used without impairing the threshold voltage.

Figure 10A:
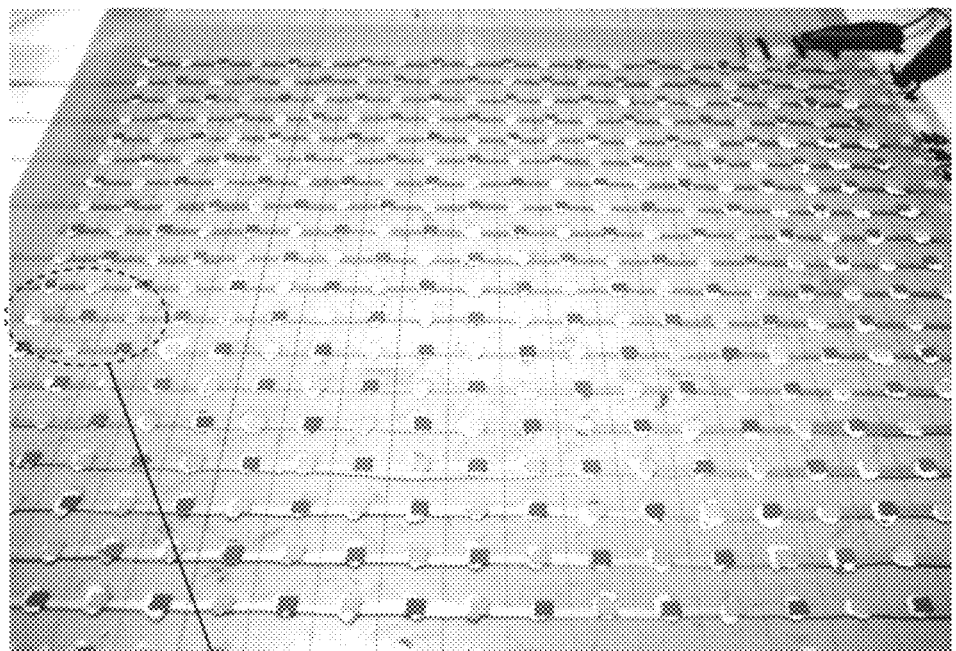
FIG. 10a is a photograph of a display device.
Figure 10B:
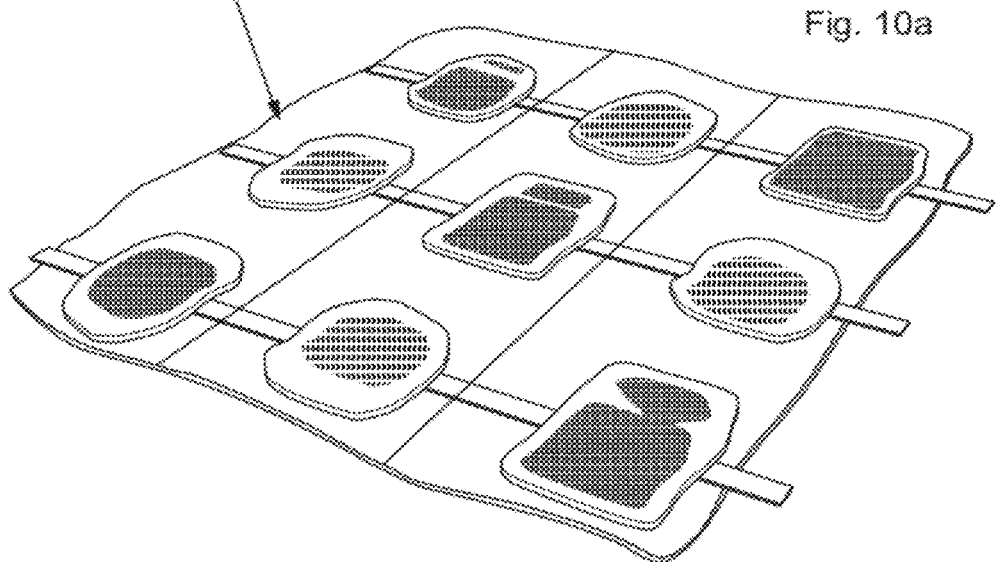
FIG. 10b is an illustration based on the photograph of FIG. 10a, and reflecting a portion of the display device.

FIG. 10a is a photograph of a passive matrix addressed display, manufactured according to the third example described above, and updated according to a chess board pattern. This particular matrix display contained 20×20 electrochromic pixel devices, and no substantial cross-talk could be observed, i.e. the respective pixel is either dark or clear. FIG. 10b is a sketch reflecting a portion of display, corresponding to the content in the dashed circle in FIG. 10a. The sketch of FIG. 10b has a slight clockwise rotation compared to FIG. 10a. In the photograph, Ag-electrodes extend horizontally underneath each row of pixel elements. In the sketch of FIG. 10b, the Ag-electrodes are illustrated as rectangles, which decline when seen from right to left (due to the clockwise rotation). The electrodes are provided on an insulating substrate comprising a via with a carbon electrode. On the other side of the insulating substrate there are provided pixel layers comprising carbon. Further, drops of white electrolyte is provided on top of each pixel layer comprising carbon. Finally, a semi-transparent sheet comprising electrically conductive polymer is provided, and arranged such that it covers all the electrolytes, i.e. a first pixel layer is formed where said electrolyte is in contact with said semi-transparent sheet. Thin straight vertical cuts are provided in the semi-transparent sheet, in order to electronically isolate sections of pixels from each other, wherein the pixels in each section is arranged one after another from the bottom of the photograph to the top of the photograph. The distance between two vertical cuts is 1 cm. The pixels in each section are in electronic contact with each other by the semi-transparent sheet. As can be seen in the photograph, the coloring of the each pixel, i.e. the coloring of the semi-transparent sheet, correspond to an almost perfect squares. The white material surrounding the pixel is electrolyte not in contact with the semi-transparent sheet, but visible there through. In FIG. 10b, the discrete islands arranged on top of the Ag-electrodes correspond to the electrolyte. In more detail, a set of first electrodes arranged in rows designate the electrochromic pixel elements or the first pixel layer, while a set of second electrodes arranged in columns designate the second pixel layer of the matrix display. Each respective row and column was connected to the output pin of a digital integrated circuit, which was driven by a supply voltage. The desired image to be presented by the display was stored in a programmable circuit, which outputs the image by updating the whole display, either once or iteratively. The matrix display was updated row by row, even though column by column scan or individual pixel scan are other available addressing alternatives. In the row by row scan, an output enable signal activated the respective row, such that the desired pixels could be updated by applying a voltage to the respective column line. The outputs of non-active rows and non-addressed columns were disabled. The output pin of an updated row is then disabled, and the subsequent rows are updated by the same methodology.

In the above description, the invention has mainly been described with reference to a number of explicitly disclosed embodiments. However, as is readily appreciated by a person skilled in the art, embodiments other than the ones disclosed above are equally possible within the scope of the invention, as defined by the appended patent claims. For example, the electrochromic pixel layer of the embodiment in FIG. 5-9 is being formed of PEDOT:PSS. However, other electrochromic materials than those being formed of PEDOT:PSS may be used for the electrochromic pixel layer and fall within the scope of this invention. Additionally, other magnitudes of the applied potentials than the ones disclosed above are equally possible within the scope of the invention.

The invention claimed is:
1. A passive matrix display device, comprising:
    a set of pixel cells arranged in a matrix,
    wherein each of the pixel cells includes,
        a first pixel layer including an electronically conducting electrochromic and electrochemically active organic polymer material being electrochemically switchable between different visually detectable coloring states,
        a second pixel layer facing said first pixel layer, and
        a third pixel layer of solidified electrolyte, said solidified electrolyte being a polycationic or polyanionic electrolyte, wherein said third pixel layer is arranged spatially between, and in ionic contact with, said first and second pixel layers, and said third pixel layer is free of electrochromic material,
    wherein the coloring of each pixel cell is provided by a change in redox state of said electrochromic and electrochemically active organic polymer material of said first pixel layer, and the color of the third pixel layer remains unchanged during a color switching of the pixel,
    wherein said second pixel layer of each of said pixel cells is formed of a material including electrically conductive carbon, which in combination with the materials in the first and third pixel layers in all pixel cells provides a threshold voltage at least in response to a potential difference applied across said pixel cell, and
    wherein the potential difference is set so that a sum of potential differences distributed in a non-addressed cell by cross-talk from addressed pixel cells is lower than the threshold voltage of the pixel cell.
2. The display device according to claim 1, further comprising:
    a set of first electrodes and a set of second electrodes, which are electronically isolated from each other and arranged such that,
        each of said first electrodes intersects each of said second electrodes at only one intersection, and
        each of said pixel cells is arranged at a respective one of said intersections formed by a respective first and second electrodes, wherein said first pixel layer of each of said pixel cells coincides with a portion of said respective first electrode, and
wherein said second pixel layer of each of said pixel cells coincides with a portion of, or is in electronic contact with, said respective second electrode.

3. The display device according to claim 2, wherein said first electrodes and the first pixel layer of said pixel cells all include the same material, or
wherein said second electrodes and the second pixel layer of said pixel cells all include the same material.

4. The display device according to claim 2, wherein said first electrodes and the first pixel layer of said pixel cells all include the same material, and
wherein said second electrodes and the second pixel layer of said pixel cells all include the same material.

5. The display device according to claim 4, wherein said first electrodes and the first pixel layer of each of said pixel cells are all portions of the same layer, and
wherein said second electrodes and the second pixel layer of each of said pixel cells are all portions of the same layer.

6. The display device according to claim 4, wherein said first electrodes and the first pixel layer of each of said pixel cells are all portions of the same layer, or
wherein said second electrodes and the second pixel layer of each of said pixel cells are all portions of the same layer.

7. The display device according to claim 1, further comprising:
a set of first electrodes and a set of second electrodes, which are electronically isolated from each other and arranged such that,
each of said first electrodes intersects each of said second electrodes at only one intersection, and
each of said pixel cells is arranged at a respective one of said intersections formed by a respective first and second electrodes,
wherein said first pixel layer of each of said pixel cells is in electronic contact with said respective first electrode, and
wherein said second pixel layer of each of said pixel cells coincides with a portion of, or is in electronic contact with, said respective second electrode.

8. The display device according to claim 7, further comprising: a plastic insulating layer arranged between said second electrode and said second pixel layer in each pixel cell of said set of pixel cells,
wherein said plastic insulating layer includes a plurality of passages each arranged with an electronic conductor, and
wherein said electronic conductors each electronically connects a respective second pixel layer and said second electrode of a respective pixel cell.

9. The display device according to claim 1, wherein the display device is configured to operate without a set of separate control elements, each control element being associated with a respective one of said pixel cells and arranged to provide a transistor function for actively controlling the color of said respective one of said pixel cells.

10. The display device according to claim 1, wherein the display device is on a flexible substrate, and
wherein said flexible substrate includes at least one selected from paper and plastic.

11. The display device according to claim 1, wherein said display device is formed of a plurality of layers, and
wherein said plurality of layers are at least one of printable and flexible.

12. The display device according to claim 1, wherein, in each of said pixel cells, said second pixel layer covers a center portion of said third pixel layer.

13. The display device according to claim 1, wherein, in each of said pixel cells, a surface area of the second pixel layer is at least 60%, or at least 75%, or at least 90%, or at least 95% of a surface area of the solidified electrolyte.

14. The display device according to claim 1, further comprising:
at least one opacifier having a color that remains the same when the voltage is applied across the respective one of said pixel cells.

15. The display device according to claim 1, wherein a color of the solidified electrolyte remains the same or substantially the same when the voltage is applied across the respective one of said pixel cells.

16. The display device according to claim 1, wherein the electrochromic and electrochemically active organic polymer material is selected from the group consisting of electrochromic polythiophenes, electrochromic polypyrroles, electrochromic polyanilines, electrochromic polyisothianaphthalenes, electrochromic polyphenylene vinylenes and copolymers thereof.

17. The display device according to claim 16, wherein the electrochromic and electrochemically active organic polymer material is selected from the group consisting of electrochromic polythiophenes and copolymers thereof.

18. The display device according to claim 17, wherein the electrochromic and electrochemically active organic polymer material is a homopolymer or copolymer of 3,4-dialkoxythiophene, in which said two alkoxy groups may be the same or different or together represent an optionally substituted oxy-alkylene-oxy bridge.

19. The display device according to claim 18, wherein the electrochromic and electrochemically active organic polymer material is poly(3,4-ethylenedioxythiophene) polystyrene sulfonate (PEDOT:PSS).

20. A method of controlling a passive matrix display device including a set of pixel cells arranged in a matrix, wherein each pixel cell includes,
a first pixel layer including an electronically conducting electrochromic and electrochemically active organic polymer material being electrochemically switchable between different visually detectable coloring states,
a second pixel layer facing said first pixel layer, and
a third pixel layer of solidified electrolyte, said solidified electrolyte being a polycationic or polyanionic electrolyte, wherein said third pixel layer is arranged spatially between, and in ionic contact with, said first and second pixel layers, and said third pixel layer is free of electrochromic material,
the method comprising:
applying and maintaining a potential difference between said first pixel layer and said second pixel layer,
wherein said potential difference causes said first pixel layer to change color,
wherein the coloring of each pixel cell is provided by a change in redox state of said electrochromic and electrochemically active organic polymer material of said first pixel layer, and the color of the third pixel layer remains unchanged during a color switching of the pixel, wherein said second pixel layer of each of the pixel cells is formed of, or includes, electrically conductive carbon, which in combination with the materials in the first and third pixel layers in all pixel cells provides a threshold voltage at least in response to a potential difference applied across said pixel cell, and wherein the potential difference is set so that a sum of potential differences distributed in a non-addressed cell by cross-talk from addressed pixel cells is lower than the threshold voltage of the pixel cell.

21. A passive matrix display device, comprising:

a set of pixel cells arranged in a matrix, wherein each of the pixel cells includes, a first pixel layer including an electronically conducting electrochromic and electrochemically active organic polymer material being electrochemically switchable between different visually detectable coloring states, a second pixel layer facing said first pixel layer, and a third pixel layer of solidified electrolyte, said solidified electrolyte being a polycationic or polyanionic electrolyte, wherein said third pixel layer is arranged spatially between, and in ionic contact with, said first and second pixel layers, and said third pixel layer is free of electrochromic material, wherein:

said third pixel layer is patterned so as to form discontinuous islands, wherein each island is confined to one pixel cell, the coloring of each pixel cell is provided by a change in redox state of said electrochromic and electrochemically active organic polymer material of said first pixel layer, and the color of the third pixel layer remains unchanged during a color switching of the pixel, and said second pixel layer of each of said pixel cells is formed of a material including electrically conductive carbon, which in combination with the materials in the first and third pixel layers in all pixel cells provides a threshold voltage at least in response to a potential difference applied across said pixel cell, and wherein the potential difference is set so that a sum of potential differences distributed in a non-addressed cell by cross-talk from addressed pixel cells is lower than the threshold voltage of the pixel cell.

22. A passive matrix display device, comprising:

a set of first electrodes, each of the first electrodes includes an electrochromic and electrochemically active organic polymer material that is electrochemically switchable between different visually detectable coloring states; and a set of second electrodes, wherein the set of first electrodes and the set of second electrodes are electronically isolated from each other and arranged such that each of the first electrodes intersects each of the second electrodes at only one intersection, and at each intersection there is arranged a pixel cell, and the pixel cells are arranged in a matrix, wherein each pixel cell includes:

a first pixel layer which is the portion of the respective first electrode located at the intersection;

a second pixel layer facing the first pixel layer, and a third pixel layer of solidified electrolyte which is arranged spatially between, and in ionic contact with, the first and second pixel layers, wherein the second pixel layer of each pixel cell is formed of a material including electrically conductive carbon, and the solidified electrolyte is a polycationic electrolyte or a polyanionic electrolyte, thereby providing a threshold voltage in response to a potential difference applied across the pixel cell, wherein the coloring of each pixel cell is provided by a change In redox state of the electrochromic and electrochemically active organic polymer material, and the color of the electrolyte remains unchanged during a color switching of the pixel cell, wherein the second pixel layer of each pixel cell is either the portion of the respective second electrode located at the intersection, or a separate layer in electronic contact with the respective second electrode at the intersection, and wherein the potential difference is set so that a sum of potential differences distributed in a non-addressed cell by cross-talk from addressed pixel cells is lower than the threshold voltage of the pixel cell.

* * * * *